(12) United States Patent
Li et al.

(10) Patent No.: US 12,204,696 B2
(45) Date of Patent: Jan. 21, 2025

(54) HAND-GESTURE-BASED INTERACTION METHOD AND APPARATUS, AND CLIENT

(71) Applicant: BEIJING BYTEDANCE NETWORK TECHNOLOGY CO., LTD., Beijing (CN)

(72) Inventors: Yichen Li, Beijing (CN); Jun Zhou, Beijing (CN); Lin Wang, Beijing (CN)

(73) Assignee: BEIJING BYTEDANCE NETWORK TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 18/520,876

(22) Filed: Nov. 28, 2023

(65) Prior Publication Data
US 2024/0094826 A1    Mar. 21, 2024

Related U.S. Application Data

(63) Continuation of application No. PCT/CN2022/092451, filed on May 12, 2022.

(30) Foreign Application Priority Data

May 28, 2021    (CN) .......................... 202110592514.0

(51) Int. Cl.
G06F 3/01    (2006.01)
G06T 13/00    (2011.01)

(52) U.S. Cl.
CPC .............. *G06F 3/017* (2013.01); *G06T 13/00* (2013.01)

(58) Field of Classification Search
CPC .......... G06F 3/017; G06F 3/01; G06F 3/0484; G06F 1/1686; G06F 3/0483; G06F 3/04842; G06T 13/00
See application file for complete search history.

(56) References Cited

U.S. PATENT DOCUMENTS

| 10,372,298 B2 * | 8/2019 | Anzures .................. H04L 51/10 |
| 10,887,033 B1 * | 1/2021 | Tessmann ............ G10H 1/0008 |

(Continued)

FOREIGN PATENT DOCUMENTS

| CN | 107340852 A | 11/2017 |
| CN | 107786549 A | 3/2018 |

(Continued)

OTHER PUBLICATIONS

International Search Report (with English translation) and Written Opinion issued in PCT/CN2022/092451, dated Jul. 25, 2022, 10 pages provided.

(Continued)

*Primary Examiner* — Grant Sitta
(74) *Attorney, Agent, or Firm* — Astute IP Law Group

(57) ABSTRACT

The present disclosure relates to a hand-gesture-based interaction method and apparatus, and a client. The method includes: in a live stream process of one network live stream, when a function of playback of a hand gesture animation is in an activated state, a client of an anchor user recognizes a hand gesture of the anchor user. When a hand gesture category matches a preset category of the hand gesture animation, the client of the anchor user plays back the hand gesture animation in a first area corresponding to a hand gesture position, and transmits a first content to a client of a viewing user through a first server. The client of the viewing user, based on the first content, plays back the hand gesture animation in a second area corresponding to the hand gesture position, and detects a trigger operation on the second area.

20 Claims, 11 Drawing Sheets

(56) References Cited

U.S. PATENT DOCUMENTS

| | | |
|---|---|---|
| 11,106,342 B1* | 8/2021 | Al Majid ............ G06F 3/04845 |
| 11,516,552 B2* | 11/2022 | Bernstein ......... H04N 21/44213 |
| 2015/0365627 A1 | 12/2015 | Deng et al. |
| 2017/0286913 A1* | 10/2017 | Liu ........................ H04W 4/12 |
| 2018/0343294 A1* | 11/2018 | Rands .............. G06F 16/24575 |
| 2019/0266807 A1* | 8/2019 | Lee ........................ G06T 11/001 |
| 2019/0373319 A1* | 12/2019 | Greenberger ...... H04N 21/2668 |
| 2020/0059683 A1* | 2/2020 | Grigsby ............. H04N 21/6408 |
| 2020/0382745 A1 | 12/2020 | Trenh et al. |
| 2021/0176197 A1* | 6/2021 | Al Majid ................ H04L 51/52 |
| 2021/0358188 A1* | 11/2021 | Lebaredian ............ G06T 13/00 |
| 2022/0191157 A1* | 6/2022 | Lee ....................... H04L 51/063 |
| 2022/0334649 A1* | 10/2022 | Hwang ................ G06F 3/0482 |
| 2023/0384868 A1* | 11/2023 | Sun .................... H04N 21/4312 |

FOREIGN PATENT DOCUMENTS

| | | |
|---|---|---|
| CN | 109195001 A | 1/2019 |
| CN | 110703913 A | 1/2020 |
| CN | 112073821 A | 12/2020 |

OTHER PUBLICATIONS

Extended European Search Report for European Patent Application No. 22810377.6, mailed on Oct. 9, 2024, 13 pages.
Office Action for Chinese Patent Application No. 202110592514.0, mailed on Oct. 25, 2024, 17 pages.
Communication pursuant to Rules 70(2) and 70a(2) EPC for European Patent Application No. 22810377.6, mailed on Oct. 29, 2024, 1 page.

\* cited by examiner

HAND-GESTURE-BASED INTERACTION METHOD AND APPARATUS, AND CLIENT

CROSS-REFERENCE TO RELATED APPLICATIONS

This application is a continuation of International Application No. PCT/CN2022/092451, as filed on May 12, 2022, which claims the priority to the Chinese Patent Application No. 202110592514.0 entitled "HAND-GESTURE-BASED INTERACTION METHOD AND APPARATUS, AND CLIENT" and filed with the Chinese Patent Office on May 28, 2021. The disclosure of each of these applications is incorporated herein by reference in its entirety.

TECHNICAL FIELD

The present disclosure relates to the technical field of live stream, and in particular, to a hand-gesture-based interaction method and apparatus, and a client.

BACKGROUND

With the continuous development of Internet technology, network live stream has come into being, which provides rich and colorful entertainments for users, and can realize real-time interaction among a plurality of users in different places.

Currently, an anchor user can start one network live stream through a client of the anchor user, that is, the client of the anchor user allocates one access address (called a virtual live stream room) for the network live stream, and a viewing user can enter the network live stream through a client of the viewing user, so that viewing and interaction of the network live stream are realized.

SUMMARY

The present disclosure provides a hand-gesture-based interaction method and apparatus, and a client.

In a first aspect, the present disclosure provides a hand-gesture-based interaction method applied to a client of an anchor user, the method comprising:
  recognizing a hand gesture category and a hand gesture position corresponding to a hand gesture of the anchor user; and
  when the hand gesture category matches a preset category of a hand gesture animation, playing back the hand gesture animation in a first area corresponding to the hand gesture position, and transmitting a first content which is used for representing a situation of the playback of the hand gesture animation to a client of a viewing user through a first server, so that the client of the viewing user, based on the first content, plays back the hand gesture animation in a second area corresponding to the hand gesture position and detects a trigger operation on the second area, wherein the trigger operation on the second area is used for triggering display of a target page, and the target page is used for providing an entry for interaction with the anchor user.
  A trigger operation on the first area is shielded while the hand gesture animation is played back in the first area.

In a possible design, the first content comprises: a start identification, the preset category, the hand gesture position, and/or a trigger identification, wherein the start identification is used for representing that it is to start the playback of the hand gesture animation, the preset category is used for determining audio and video of the hand gesture animation, the hand gesture position is used for determining the second area, and the trigger identification is used for representing a webpage address of the target page or a page identification of the target page in the client of the viewing user.

In a possible design, the method further comprises:
  when the playback of the hand gesture animation ends, stopping the playback of the hand gesture animation in the first area, and transmitting a second content which is used for representing a situation of stopping the playback of the hand gesture animation to the client of the viewing user through the first server, so that the client of the viewing user, based on the second content, stops the playback of the hand gesture animation in the second area and shields the trigger operation on the second area.

In a possible design, the second content comprises: an ending identification and the preset category, wherein the ending identification is used for representing that it is to end the playback of the hand gesture animation, and the preset category is used for determining audio and video of the hand gesture animation.

In a possible design, the method further comprises:
  after receiving a trigger operation on a banner area, displaying a configuration page which is used for providing an entry as to whether to activate a function of the playback of the hand gesture animation, wherein the configuration page comprises a switch control which is used for activating or deactivating the function of the playback of the hand gesture animation;
  after receiving a trigger operation on the switch control in a deactivated state, determining whether a resource package of audio and video of the hand gesture animation has been downloaded;
  when the resource package has not been downloaded, determining it is the first time to activate the function of the playback of the hand gesture animation; and
  when the resource package has been downloaded, determining it is not the first time to activate the function of the playback of the hand gesture animation.

In a possible design, when it is the first time to activate the function of the playback of the hand gesture animation, the method further comprises:
  transmitting, to a second server, a first request which is used for requesting to activate the function of the playback of the hand gesture animation and download the resource package, wherein the first request carries the preset category;
  receiving, from the second server, a first response which carries a first identification, a second identification, the preset category, and the resource package, wherein the first identification is used for representing that the second server has updated a current state of the function of the playback of the hand gesture animation to an activated state, and the second identification is used for representing that the function of the playback of the hand gesture animation is usable; and
  after receiving the second identification, storing the preset category and the resource package, and recognizing the hand gesture category and the hand gesture position.

In a possible design, wherein when it is not the first time to activate the function of the playback of the hand gesture animation, the method further comprises:
  transmitting, to the second server, a second request which is used for requesting to activate the function of the playback of the hand gesture animation, wherein the second request carries the preset category;

receiving, from the second server, a second response which carries a first identification, a second identification, and the preset category, wherein the first identification is used for representing that the second server has updated a current state of the function of the playback of the hand gesture animation to an activated state, and the second identification is used for representing that the function of the playback of the hand gesture animation is usable; and after receiving the second identification, recognizing the hand gesture category and the hand gesture position.

In a possible design, the method further comprises:

after receiving a trigger operation on the switch control in an activated state, determining to deactivate the function of the playback of the hand gesture animation.

In a possible design, wherein when the function of the playback of the hand gesture animation is deactivated, the method further comprises:

transmitting, to the second server, a third request which is used for requesting to deactivate the function of the playback of the hand gesture animation, wherein the third request carries the preset category;

receiving, from the second server, a third response which carries a third identification, a fourth identification, and the preset category, wherein the third identification is used for representing that the second server has updated a current state of the function of the playback of the hand gesture animation to a deactivated state, and the fourth identification is used for representing that the function of the playback of the hand gesture animation has been stopped to be used; and after receiving the fourth identification, stopping recognizing the hand gesture category and the hand gesture position.

In a second aspect, the present disclosure provides a hand-gesture-based interaction method applied to a client of a viewing user; the method comprises:

receiving a first content from a client of the anchor user through a first server, wherein the first content is transmitted by the client of the anchor user when a hand gesture category corresponding to a hand gesture of the anchor user matches a preset category of a hand gesture animation, and the first content is used for representing a situation of playback of the hand gesture animation; and based on the first content, playing back the hand gesture animation in a second area which corresponds to a hand gesture position corresponding to the hand gesture of the anchor user, and detecting a trigger operation on the second area, wherein the trigger operation on the second area is used for triggering display of a target page, and the target page is used for providing an entry for interaction with the anchor user.

In a possible design, the first content comprises: a start identification, the preset category, the hand gesture position, and/or a trigger identification, wherein the start identification is used for representing that it is to start the playback of the hand gesture animation, the preset category is used for determining audio and video of the hand gesture animation, the hand gesture position is used for determining the second area, and the trigger identification is used for representing a webpage address of the target page or a page identification of the target page in the client of the viewing user.

In a possible design, a hand gesture control is comprised in the second area, wherein the hand gesture control is used for triggering the display of the target page; and the method further comprises:

after receiving a trigger operation on the hand gesture control, displaying the target page.

In a possible design, the method further comprises:

receiving a second content which is used for representing a situation of stopping the playback of the hand gesture animation from the client of the anchor user through the first server, wherein the second content is transmitted by the client of the anchor user when the playback of the hand gesture animation ends; and based on the second content, stopping the playback of the hand gesture animation in the second area and shielding the trigger operation on the second area.

In a possible design, the second content comprises: an ending identification and the preset category, wherein the ending identification is used for representing that it is to end the playback of the hand gesture animation, and the preset category is used for determining audio and video of the hand gesture animation.

In a third aspect, the present disclosure provides a hand-gesture-based interaction apparatus applied to a client of an anchor user; the apparatus comprising:

a recognition module configured to recognize a hand gesture category and a hand gesture position corresponding to a hand gesture of the anchor user; and a first processing module configured to, when the hand gesture category matches a preset category of a hand gesture animation, play back the hand gesture animation in a first area corresponding to the hand gesture position, and transmit a first content which used for representing a situation of the playback of the hand gesture animation to a client of a viewing user through a first server, so that the client of the viewing user, based on the first content, plays back the hand gesture animation in a second area corresponding to the hand gesture position and detects a trigger operation on the second area, wherein the trigger operation on the second area is used for triggering display of a target page, and the target page is used for providing an entry for interaction with the anchor user.

The first processing module is further configured to shield a trigger operation on the first area while the hand gesture animation is played back in the first area.

In a possible design, the first content comprises: a start identification, the preset category, the hand gesture position, and/or a trigger identification, wherein the start identification is used for representing that it is to start the playback of the hand gesture animation, the preset category is used for determining audio and video of the hand gesture animation, the hand gesture position is used for determining the second area, and the trigger identification is used for representing a webpage address of the target page or a page identification of the target page in the client of the viewing user.

In a possible design, the first processing module is further configured to, when the playback of the hand gesture animation ends, stop the playback of the hand gesture animation in the first area, and transmit a second content which is used for representing a situation of stopping the playback of the hand gesture animation to the client of the viewing user through the first server, so that the client of the viewing user, based on the second content, stops the playback of the hand gesture animation in the second area and shields the trigger operation on the second area.

In a possible design, the second content comprises: an ending identification and the preset category, wherein the ending identification is used for representing that it is to end the playback of the hand gesture animation, and the preset category is used for determining audio and video of the hand gesture animation.

In a possible design, the first processing module is further configured to, after receiving a trigger operation on a banner area, display a configuration page which is used for providing an entry as to whether to activate a function of the playback of the hand gesture animation, wherein the configuration page comprises a switch control which is used for activating or deactivating the function of the playback of the hand gesture animation; after receiving a trigger operation on the switch control in a deactivated state, determine whether a resource package of audio and video of the hand gesture animation has been downloaded; when the resource package has not been downloaded, determine it is the first time to activate the function of the playback of the hand gesture animation; and when the resource package has been downloaded, determine it is not the first time to activate the function of the playback of the hand gesture animation.

In a possible design, the first processing module is specifically configured to, when it is the first time to activate the function of the playback of the hand gesture animation, transmit, to a second server, a first request which is used for requesting to activate the function of the playback of the hand gesture animation and download the resource package, wherein the first request carries the preset category; receive, from the second server, a first response which carries a first identification, a second identification, the preset category, and the resource package, wherein the first identification is used for representing that the second server has updated a current state of the function of the playback of the hand gesture animation to an activated state, and the second identification is used for representing that the function of the playback of the hand gesture animation is usable; and after receiving the second identification, store the preset category and the resource package, and recognize the hand gesture category and the hand gesture position.

In a possible design, the first processing module is specifically configured to, when it is not the first time to activate the function of the playback of the hand gesture animation, transmit, to the second server, a second request which is used for requesting to activate the function of the playback of the hand gesture animation, wherein the second request carries the preset category; receive, from the second server, a second response which carries a first identification, a second identification, and the preset category, wherein the first identification is used for representing that the second server has updated a current state of the function of the playback of the hand gesture animation to an activated state, and the second identification is used for representing that the function of the playback of the hand gesture animation is usable; and after receiving the second identification, recognize the hand gesture category and the hand gesture position.

In a possible design, the first processing module is further configured to, after receiving a trigger operation on the switch control in an activated state, determine to deactivate the function of the playback of the hand gesture animation.

In a possible design, the first processing module is specifically configured to, when the function of the playback of the hand gesture animation is deactivated, transmit, to the second server, a third request which is used for requesting to deactivate the function of the playback of the hand gesture animation, wherein the third request carries the preset category; receive, from the second server, a third response which carries a third identification, a fourth identification, and the preset category, wherein the third identification is used for representing that the second server has updated a current state of the function of the playback of the hand gesture animation to a deactivated state, and the fourth identification is used for representing that the function of the playback of the hand gesture animation has been stopped to be used; and after receiving the fourth identification, stop recognizing the hand gesture category and the hand gesture position.

In a fourth aspect, the present disclosure provides a hand-gesture-based interaction apparatus applied to a client of a viewing user; the apparatus comprising:
 a receiving module configured to receive a first content from a client of the anchor user through a first server, wherein the first content is transmitted by the client of the anchor user when a hand gesture category corresponding to a hand gesture of the anchor user matches a preset category of a hand gesture animation, and the first content is used for representing a situation of playback of the hand gesture animation; and
 a second processing module configured to, based on the first content, play back the hand gesture animation in a second area which corresponds to a hand gesture position corresponding to the hand gesture of the anchor user, and detect a trigger operation on the second area, wherein the trigger operation on the second area is used for triggering display of a target page, and the target page is used for providing an entry for interaction with the anchor user.

In a possible design, the first content comprises: a start identification, the preset category, the hand gesture position, and/or a trigger identification, wherein the start identification is used for representing that it is to start the playback of the hand gesture animation, the preset category is used for determining audio and video of the hand gesture animation, the hand gesture position is used for determining the second area, and the trigger identification is used for representing a webpage address of the target page or a page identification of the target page in the client of the viewing user.

In a possible design, the second processing module is further configured to comprise a hand gesture control in the second area, which is used for triggering the display of the target page; and after receiving a trigger operation on the hand gesture control, display the target page.

In a possible design, the second processing module is further configured to receive a second content which is used for representing a situation of stopping the playback of the hand gesture animation from the client of the anchor user through the first server, wherein the second content is transmitted by the client of the anchor user when the playback of the hand gesture animation ends; and based on the second content, stop the playback of the hand gesture animation in the second area and shield the trigger operation on the second area.

In a possible design, the second content comprises: an ending identification and the preset category, wherein the ending identification is used for representing that it is to end the playback of the hand gesture animation, and the preset category is used for determining audio and video of the hand gesture animation.

In a fifth aspect, the present disclosure provides a client, comprising: a memory and a processor, wherein the memory is configured to store program instructions, and the processor is configured to invoke the program instructions in the memory to cause the client to perform the hand-gesture-based interaction method in the first aspect and any of the possible designs of the first aspect, and/or the processor is configured to invoke the program instructions in the memory to cause the client to perform the hand-gesture-based interaction method in the second aspect and any of the possible designs of the second aspect.

In a sixth aspect, the present disclosure provides a non-transitory computer storage medium, comprising computer instructions which, when being run on an electronic device, cause the electronic device to perform the hand-gesture-based interaction method in the first aspect and any of the possible designs of the first aspect, and/or the hand-gesture-based interaction method in the second aspect and any one of the possible designs of the second aspect.

In a seventh aspect, the present disclosure provides a computer program product having a computer program stored thereon, wherein the computer program, when being run on a computer, causes the computer to perform the hand-gesture-based interaction method in the first aspect and any of the possible designs of the first aspect, and/or the hand-gesture-based interaction method in the second aspect and any of the possible designs of the second aspect.

In an eighth aspect, the present disclosure provides a computer program which, when being run on a computer, causes the computer to perform the hand-gesture-based interaction method in the first aspect and any of the possible designs of the first aspect, and/or the hand-gesture-based interaction method in the second aspect and any of the possible designs of the second aspect.

In a ninth aspect, the present disclosure provides a chip system applied to an electronic device comprising a display, a memory, and a sensor; wherein the chip system comprises: a processor; when the processor executes computer instructions stored in the memory, the electronic device performs the hand-gesture-based interaction method in the first aspect and any of the possible designs of the first aspect, and/or the hand-gesture-based interaction method in the second aspect and any of the possible designs of the second aspect.

BRIEF DESCRIPTION OF THE DRAWINGS

The accompanying drawings, which are incorporated in and constitute part of this specification, illustrate embodiments consistent with the present disclosure and, together with the description, serve to explain the principles of the present disclosure.

In order to more clearly illustrate technical solutions in the embodiments of the present disclosure or the related art, the drawings that need to be used in the description of the embodiments or related art will be briefly described below, and it is apparent that, for one of ordinary skill in the art, other drawings can also be obtained according to these drawings without paying out creative efforts.

DETAILED DESCRIPTION

In order that the above objects, features and advantages of the present disclosure may be more clearly understood, solutions of the present disclosure will be further described below. It should be noted that, in the case of no conflict, the embodiments of the present disclosure and features in the embodiments may be combined with each other.

In the following description, numerous specific details are set forth in order to provide thorough understanding of the present disclosure, but the present disclosure may be implemented in other ways different from those described herein; and it is apparent that the embodiments in the description are only some embodiments of the present disclosure, rather than all embodiments.

In the related art, an anchor user often achieves interaction with viewing users by replying to comment messages of the viewing users. Hence, the interaction is single and uninteresting, which goes against the viewing users' continuing viewing and interaction as to the network live stream, and downgrades the interactive experience of real-time interaction when the viewing users view the network live stream. The present disclosure aims to solve this technical problem or at least partially solve this technical problem.

Figure 1:
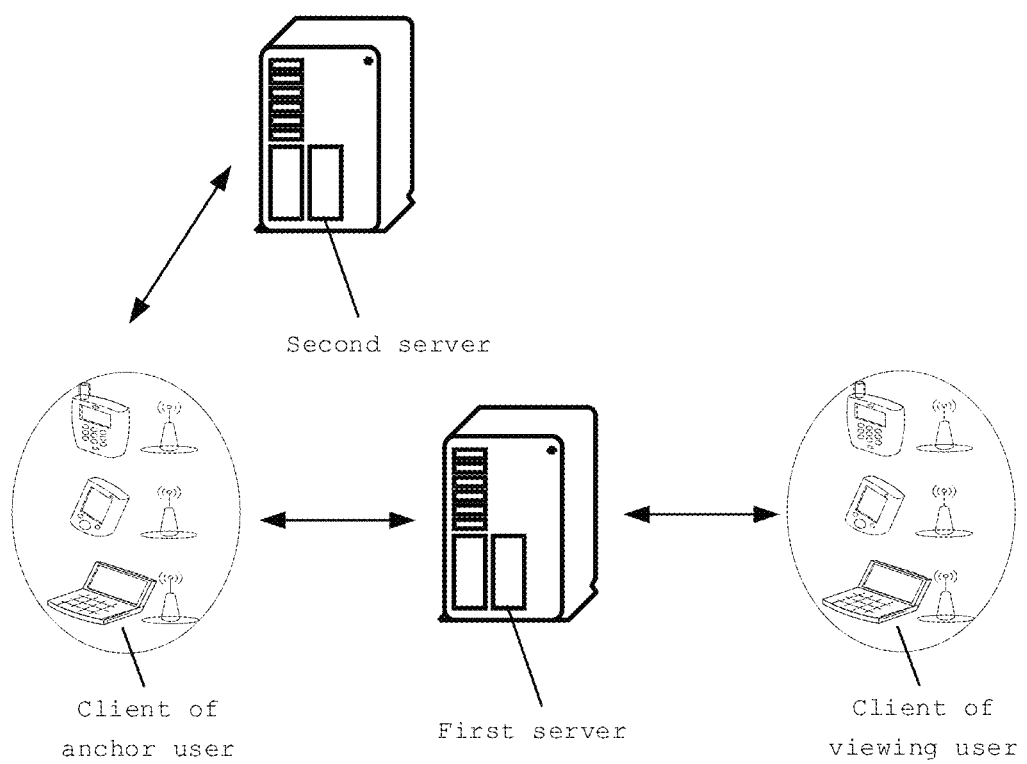
FIG. 1 is a schematic architecture diagram of a communication system provided by an embodiment of the present disclosure.

Reference is made to FIG. 1, which is a schematic architecture diagram of a communication system provided by an embodiment of the present disclosure.

As shown in FIG. 1, the communication system provided by the present disclosure may comprise: a server and a client, between which mutual communication can be achieved.

The client may be a client having a function of starting a network live stream (referred to as a client of an anchor user for short), a client having a function of entering the network live stream (referred to as a client of a viewing user for short), or a client having both the functions of starting the network live stream and entering the network live stream.

The client may implement the display method for a virtual live stream room of the present disclosure by means of an application (APP) in a terminal device, an official account, a webpage and the like, and the client or the terminal device or an electronic device may include a device such as a mobile phone (such as a foldable mobile phone, and a smart phone), a personal digital assistant (PDA), a tablet computer, a notebook computer, a ultra-mobile personal computer (UMPC), a netbook, a wearable electronic device, and a smart home device, and the present disclosure does not impose any limitation on the specific type thereof.

The present disclosure does not impose limitation on a type of an operating system of the terminal device. For example, an Android system, a Linux system, a Windows system, or an iOS system, etc.

The present disclosure does not impose limitation on a type of an operating system of the electronic device. For example, an Android system, a Linux system, a Windows system, an iOS system, etc.

For ease of illustration, in FIG. 1, for example, the communication system includes a client of an anchor user, a client of a viewing user, a first server, and a second server. The first server is a server corresponding to a content delivery network (CDN). The first server and the second server may be the same or different servers.

In the present disclosure, the client of the anchor user and the client of the viewing user may communicate with each other, which can be understood as that, the client of the anchor user and the client of the viewing user may synchronize a live stream in one network live stream through the first server of the content delivery network.

The live stream mentioned in this disclosure may include: audio and video of the network live stream and audio and video of a hand gesture animation, the hand gesture animation being audio and video of a hand gesture corresponding to a preset category.

The client of the anchor user can pack the audio and video of the network live stream to obtain a data packet 1. The client of the anchor user may pack a situation of the playback/stopping the playback of the hand gesture animation by using supplemental enhancement information (SEI), to obtain a data packet 2.

The client of the anchor user may pack the data packet 1 and the data packet 2 together into a data packet 3, and transmit the data packet 3 to the first server. After the viewing user enters the network live stream started by the anchor user, the client of the viewing user requests data from the first server. The first server may transmit the data packet 3 to the client of the viewing user.

The client of the viewing user unpacks the data packet 3 to obtain the data packet 1 and the data packet 2. The viewing user may unpack the data packet 1 to obtain the audio and video of the network live stream. The client of the viewing user may unpack the data packet 2 by using the SEI, to obtain the situation of the playback/stopping the playback of the hand gesture animation.

Therefore, the client of the viewing user, based on the audio and video of the network live stream and the situation of the playback of the hand gesture animation, can perform related operations for playing back the hand gesture animation in the network live stream; and based on the audio and video of the network live stream and the situation of stopping the playback of the hand gesture animation, can perform related operations for stopping the playback of the hand gesture animation in the network live stream.

The SEI falls within a domain of bitstreams, provides a method of adding additional information into a video bitstream, and is one of characteristics of video compression standards such as H.264/H.265. Therefore, synchronization of the network live stream and the hand gesture animation can be guaranteed.

The situation of the playback of the hand gesture animation can indicate a content such as a preset category of the hand gesture animation, a time of start of the playback of the hand gesture animation, a display position of the hand gesture animation, the audio and video of the hand gesture animation, a trigger area for the hand gesture animation being activated, a trigger identification, or the like.

A trigger operation on the trigger area is used for triggering display of a target page, and the target page is used for providing an entry for interaction with the anchor user. In some embodiments, the trigger area may comprise a hand gesture control, which is used for triggering the display of the target page.

The trigger identification is used for representing a webpage address of the target page or a page identification of the target page in the client of the viewing user.

The specific implementation of the target page is not limited in the present disclosure. In some embodiments, the target page may be a following activity page for providing an entry for following the anchor user. Alternatively, the target page may be a fans club panel for providing an entry for joining a fans club of the anchor user. Alternatively, the target page may be a gift panel for providing an entry for giving a gift to the anchor user.

The situation of stopping the playback of the hand gesture animation may indicate a content such as the preset category of the hand gesture animation, a time of stopping the playback of the hand gesture animation, and the trigger area for the hand gesture animation being shielded, or the like.

In the present disclosure, the client of the anchor user may include: a front-end and a capability module.

The front-end is configured to provide an entry for a configuration page, display the configuration page, and notify whether a function of playback of the hand gesture animation is activated.

The entry for the configuration page may be triggered through a banner area provided in a page for the network live stream, that is, the banner area is used for triggering the display of the configuration page.

The configuration page is used for providing an entry as to whether to activate the function of the playback of the hand gesture animation. In some embodiments, the configuration page may comprise: a switch control for activating or deactivating the function of the playback of the hand gesture animation.

An activated state and deactivated state of the switch control can be represented by using a switch value. In some embodiments, the switch value may be set to "1" when the switch control is in the activated state; and the switch value may be set to "0" when the switch control is in the deactivated state.

After the network live stream starts, the client of the anchor user can acquire a historical state of the function of the playback of the hand gesture animation from the second server. The client of the anchor user may synchronize the historical state of the function of the playback of the hand gesture animation to the front-end. The front-end may display the switch control in the activated state or the deactivated state based on the historical state of the function of the playback of the hand gesture animation.

The front-end may receive a trigger operation on the switch control, and determine the switch value of the switch control. The front-end may determine a current state of the function of the playback of the hand gesture animation based on the switch value of the switch control. The front-end may notify the client of the anchor user of the current state of the function of the playback of the hand gesture animation.

Therefore, when the current state of the function of the playback of the hand gesture animation is in the activated state, the client of the anchor user can determine whether a resource package of the audio and video of the hand gesture animation has been downloaded.

When the resource package of the audio and video of the hand gesture animation has not been downloaded, the client of the anchor user may determine it is the first time to activate the function of the playback of the hand gesture animation. Therefore, the client of the anchor user may request the second server to update the current state of the function of the playback of the hand gesture animation and request the resource package of the audio and video of the hand gesture animation. The second server may notify the client of the anchor user that the current state of the function of the playback of the hand gesture animation has been updated and that the function of the playback of the hand gesture animation is usable, and transmit the resource package of the audio and video of the hand gesture animation. The client of the anchor user can store the resource package of the audio and video of the hand gesture animation and start to recognize the hand gesture of the anchor user.

When the resource package of the audio and video of the hand gesture animation has been downloaded, the client of the anchor user may determine it is not the first time to activate the function of the playback of the hand gesture animation. Therefore, the client of the anchor user may request the second server to update a current state of the function of the playback of the hand gesture animation. The second server may notify the client of the anchor user that the current state of the function of the playback of the hand gesture animation has been updated and that the function of the playback of the hand gesture animation is usable. The client of the anchor user can start to recognize the hand gesture of the anchor user.

When a current state of the function of the playback of the hand gesture animation is in the deactivated state, the client of the anchor user may determine the function of the playback of the hand gesture animation is deactivated. Therefore, the client of the anchor user may request the second server to update the current state of the function of the playback of the hand gesture animation from. The second server may notify the client of the anchor user that the current state of the function of the playback of the hand gesture animation has been updated and that the function of the playback of the hand gesture animation has been stopped to be used. Then the client of the anchor user can stop recognizing the hand gesture of the anchor user.

The capability module is configured to, when the function of the playback of the hand gesture animation is deactivated, stop recognizing the hand gesture category and the hand gesture position corresponding to the hand gesture of the anchor user. When the function of the playback of the hand gesture animation is activated, the capability module recognizes the hand gesture category and the hand gesture position corresponding to the hand gesture of the anchor user, and transmits the recognized result to the client of the anchor user, such that the client of the anchor user performs a match of the hand gesture category, so as to, after the match is successful, perform related operations for playing back the hand gesture animation in synchronization with the client of the viewing user through the first server.

The capability module is further configured to, after the playback of the hand gesture animation ends, notify the client of the anchor user that the playback of the hand gesture animation has been stopped, such that the client of the anchor user performs related operations for stopping the playback of the hand gesture animation in synchronization with the client of the viewing user through the first server.

Based on the foregoing description, in conjunction with FIG. 2A to FIG. 2K, by taking examples that the electronic device is a mobile phone, clients installed in mobile phones of the anchor user and the viewing user are both short-video social APPs (application 1 and application 2 for short), and the preset category is opening five fingers, a specific implementation process of the hand-gesture-based interaction method provided by the present disclosure is described.

Reference is made to FIG. 2A to FIG. 2K, which are schematic diagrams of human-computer interaction interfaces according to embodiments of the present disclosure.

Figure 2A:
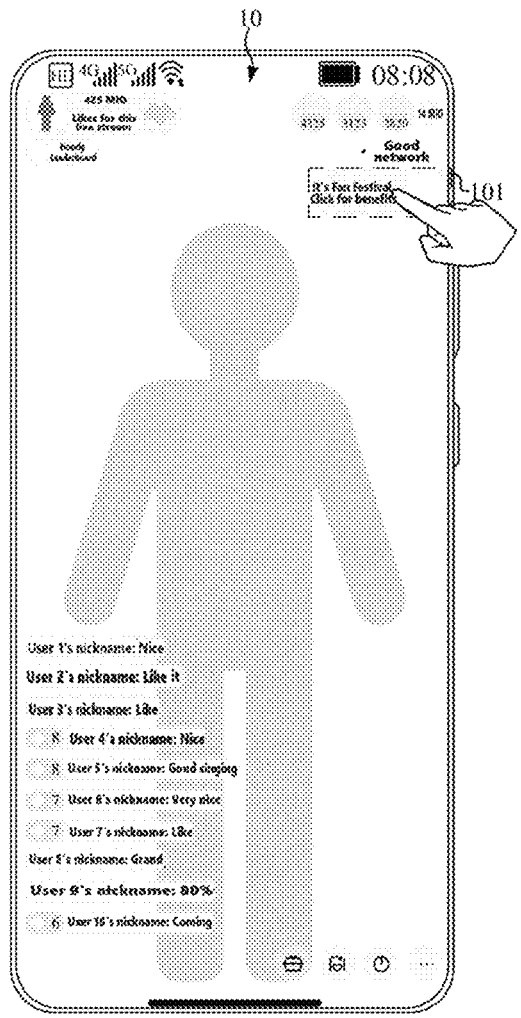
FIGS. 2A to 2K are schematic diagrams of human-computer interaction interfaces provided by embodiments of the present disclosure.

The application 1 may, on the mobile phone of the anchor user, display a user interface 10 shown in FIG. 2A, the user interface 10 being used for displaying one network live stream started by the anchor user in the application 1.

In FIG. 2A, the user interface 10 may include a banner area 101 that the user may trigger from the user interface 10. The banner area 101 is used for triggering display of a configuration page to enter the configuration page. In addition, the banner area 101 may also be used for introducing an activity notification of a function of playback of a hand gesture animation. The specific implementation of the banner area 101 is not limited in the present disclosure.

Figure 2B:
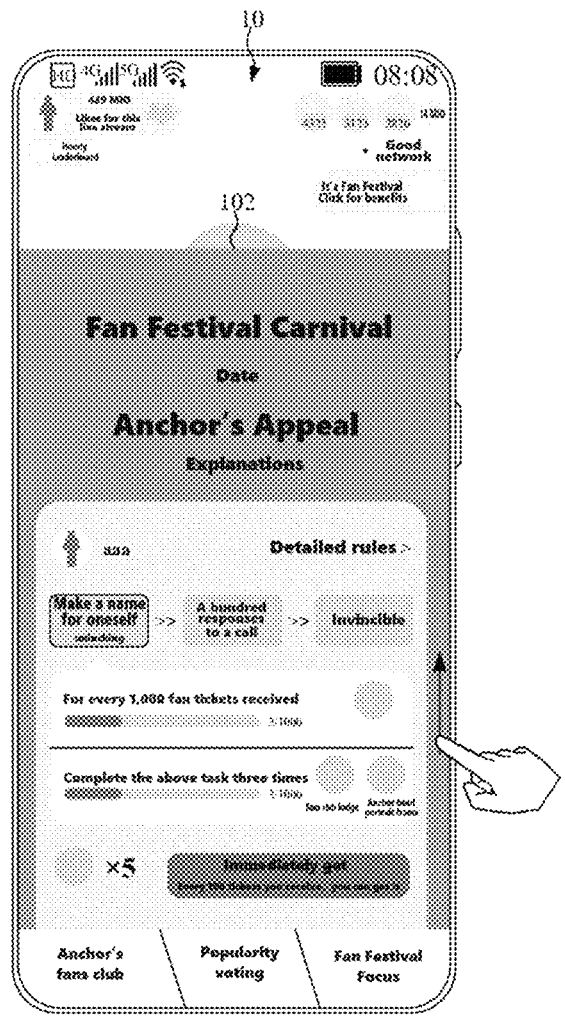

After the application 1 receives an operation, such as clicking the banner area 101, performed by the anchor user in the user interface 10 shown in FIG. 2A, the application 1 may, on the user interface 10, display a window 102 exemplarily shown in FIG. 2B, which is used for displaying the configuration page.

In FIG. 2B, the window 102 may be used for introducing activity explanations of the function of the playback of the hand gesture animation. The specific implementation of the window 102 is not limited in the present disclosure.

Figure 2C:
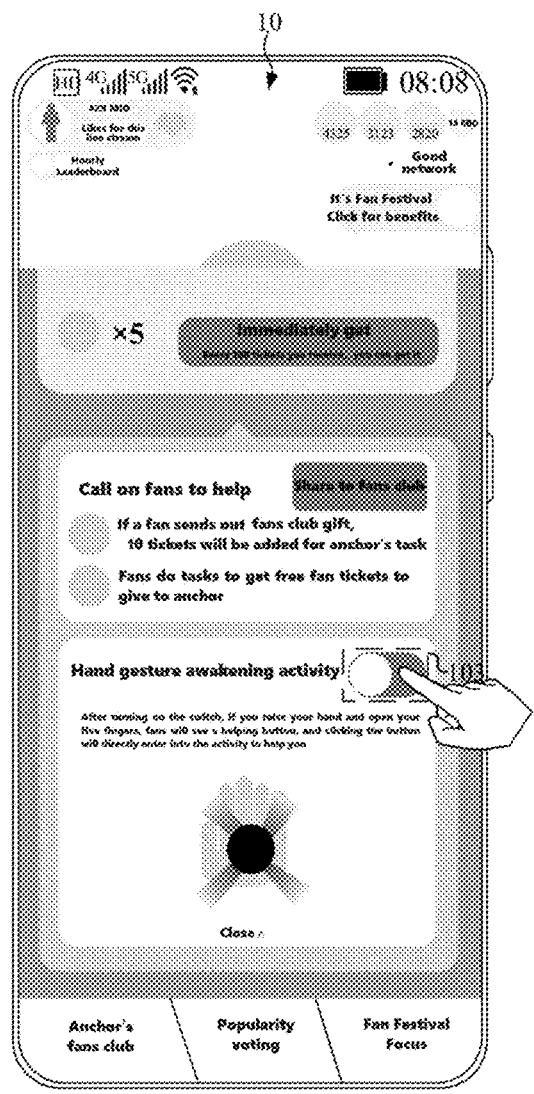

After the application 1 receives an operation, such as a swipe, performed by the anchor user in the window 102 shown in FIG. 2B, the application 1 may, on the window 102, display a switch control 103 exemplarily shown in FIG. 2C.

The switch control 103 is used for activating or deactivating the function of the playback of the hand gesture animation, and the switch control 103 may be switched between an activated state and a deactivated state.

In FIG. 2C, the switch control 103 is in the deactivated state, i.e., the function of the playback of the hand gesture animation is deactivated.

Figure 2D:

After the application 1 receives an operation, such as switching the state of the switch control 103, performed by the anchor user in the window 102 shown in FIG. 2B, when a resource package of audio and video of the hand gesture animation has not been downloaded, the application 1 may, on the window 102, display the switch control 103 in the updated state and a window 104 which are exemplarily shown in FIG. 2D. When the resource package of the audio and video of the hand gesture animation has been downloaded, the application 1 may, on the window 102, display the switch control 103 in the updated state exemplarily shown in FIG. 2D.

In FIG. 2D, the switch control 103 is in the activated state, i.e., the function of the playback of the hand gesture animation is activated. The window 104 is used for representing a downloading progress of the resource package of the audio and video of the hand gesture animation, such as a notification content representing downloaded successfully or a notification content representing that download is in process.

In summary, the application 1 has started the function of the playback of the hand gesture animation.

Furthermore, after the application 1 receives an operation, such as switching the state of the switch control 103, performed by the anchor user in the window 102 shown in FIG. 2D, the application 1 may, on the window 102, display the switch control 103 in the updated state exemplarily shown in FIG. 2C. In FIG. 2C, the switch control 103 is in the deactivated state, i.e., the function of the playback of the hand gesture animation is deactivated. Therefore, the application 1 implements the process of deactivating the function of the playback of the hand gesture animation.

It should be noted that, in addition to the above implementation, after the application 1 receives an operation, such as clicking the banner area 101, performed by the anchor user in the user interface 10 shown in FIG. 2A, the application 1 may, on the user interface 10, display the window 102 including the switch control 103 that is exemplarily shown in FIG. 2C.

In addition, when the resource package of the audio and video of the hand gesture animation has not been downloaded, the application 1 may also not display the window 104 on the window 102.

In addition, the front-end in the application 1 may implement the display of the banner area 101 and the configuration page 102, and implement the display of the switch control 103 by detecting whether the switch control 103 is in the activated state or the deactivated state. The application 1 may implement the display of the window 104.

Figure 2E:
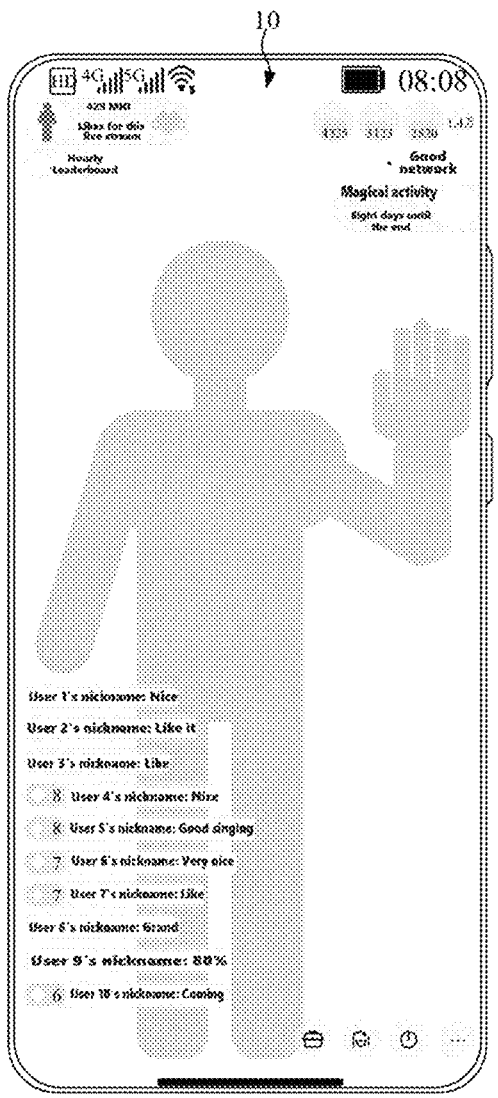

After the application 1 receives an operation, such as a click in a blank area of the user interface 10 shown in FIG. 2D, performed by the anchor user, the application 1 may, on the mobile phone, display the user interface 10 exemplarily shown in FIG. 2E. At this time, the function of the playback of the hand gesture animation in the application 1 is in the activated state.

When the anchor user makes one hand gesture, the application 1 may, on the mobile phone of the anchor user, display the user interface 10 shown in FIG. 2E, which is used for displaying the hand gesture.

Moreover, the application 1 may recognize the hand gesture category and the hand gesture position corresponding to the hand gesture in real time, and match the hand gesture category with a preset list of the hand gesture animation.

Figure 2F:
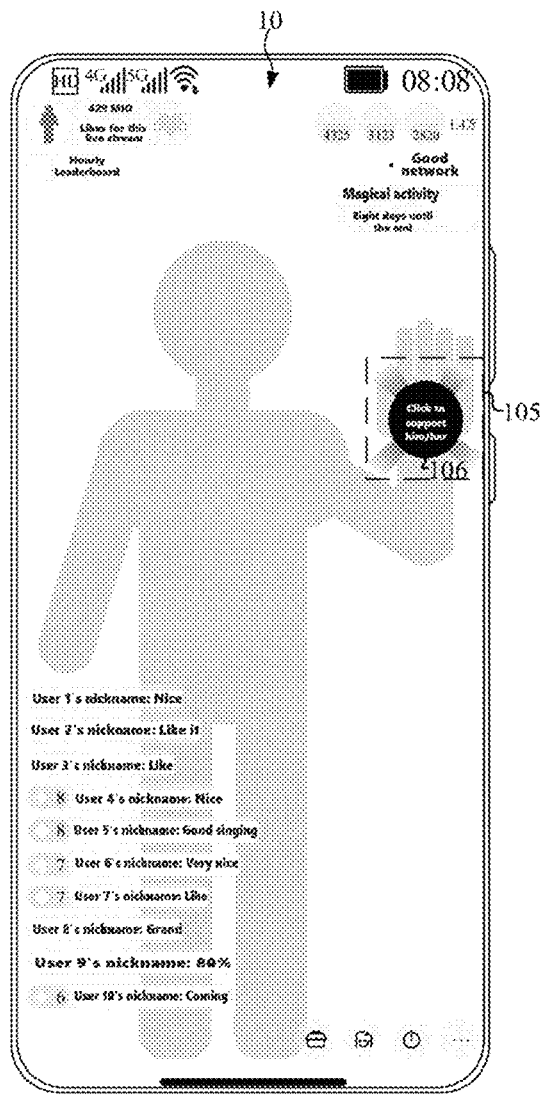

When the hand gesture category matches the preset list of hand gesture animation, the application 1 may, on the user interface 10, display a display area 105 and a hand gesture control 106 shown in FIG. 2F. The display area 105 is used for playing back the hand gesture animation. The hand gesture control 106 is used for triggering the display of the target page.

It should be noted that the display of the display area 105 and the hand gesture control 106 is used for notifying that the hand gesture made by the anchor user matches the preset category of the hand gesture animation, and that the hand gesture animation can be played back normally. In addition, the application 1 may shield a trigger operation on the hand gesture control 106, that is, after the application 1 receives an operation, such as clicking the hand gesture control 106, performed by the anchor user, the application 1 may not display the target page.

Correspondingly, when the anchor user makes one hand gesture, the application 1 can synchronize the audio and video of the network live stream to the application 2 through the first server. Therefore, based on the synchronized audio and video of the network live stream, the application 2 may, on the mobile phone of the viewing user, display a user interface 20 shown in FIG. 2G, which is used for displaying the one network live stream started by the anchor user that the viewing user enters in the application 2.

When the hand gesture category matches the preset list of the hand gesture animation, the application 1 may, through the first server, synchronize the audio and video of the network live stream and the audio and video of the hand gesture animation to the application 2. Therefore, based on the audio and video of the network live stream and the audio and video of the hand gesture animation, the application 2 may, on the user interface 20, display a display area 201 and a hand gesture control 202 shown in FIG. 2H, and detect a trigger operation on the hand gesture control 202 to enter the target page. The display area 201 is used for playing back the hand gesture animation. The hand gesture control 202 is used for triggering the display of the target page.

Figure 2G:
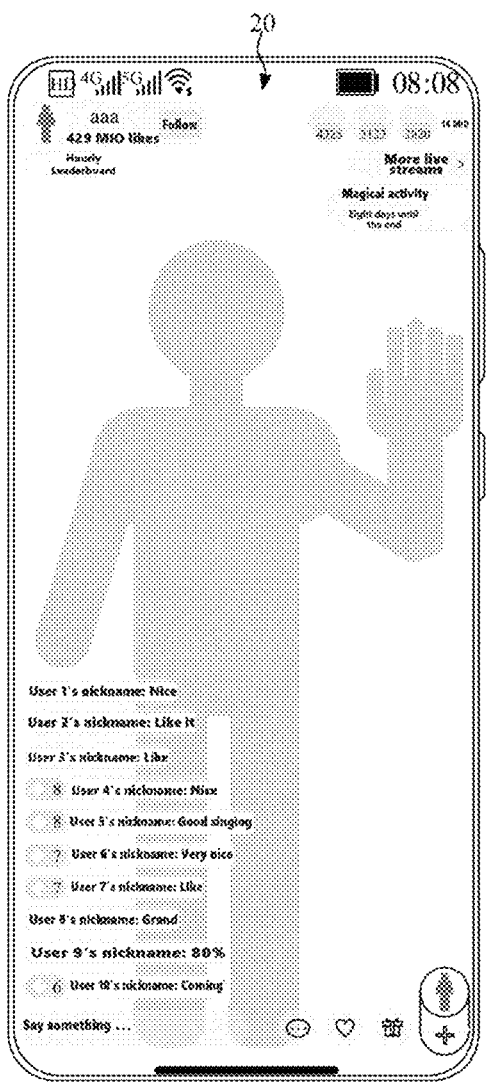
Figure 2H:
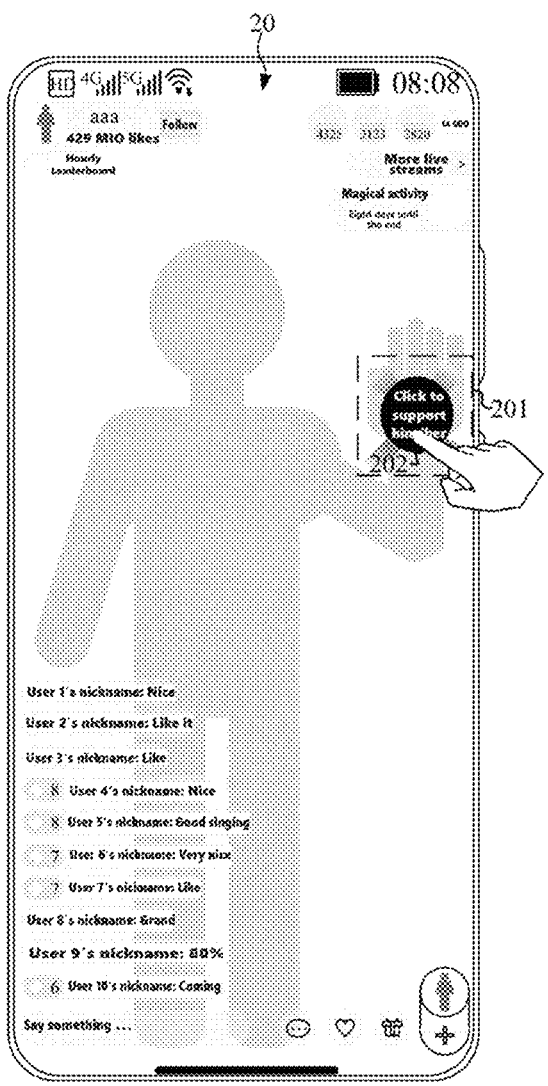
Figure 2I:
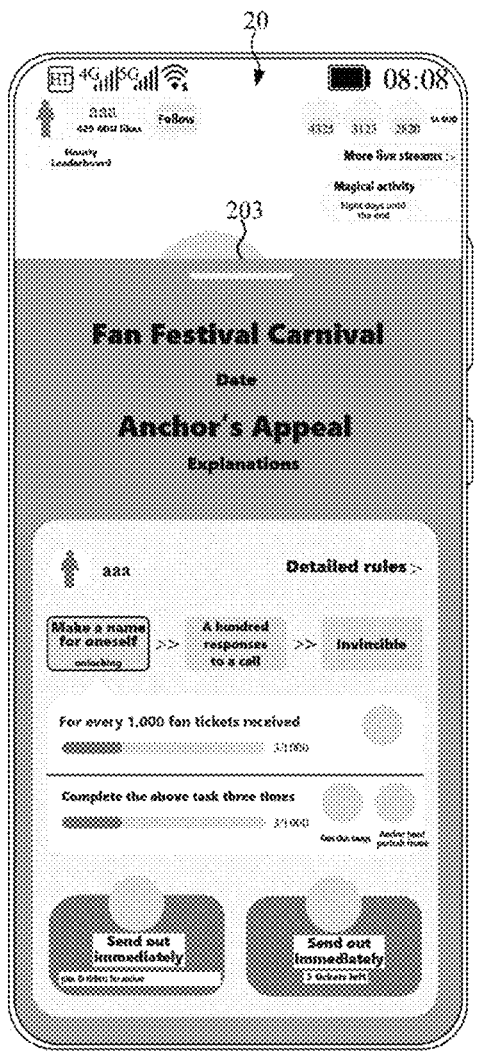
Figure 2J:
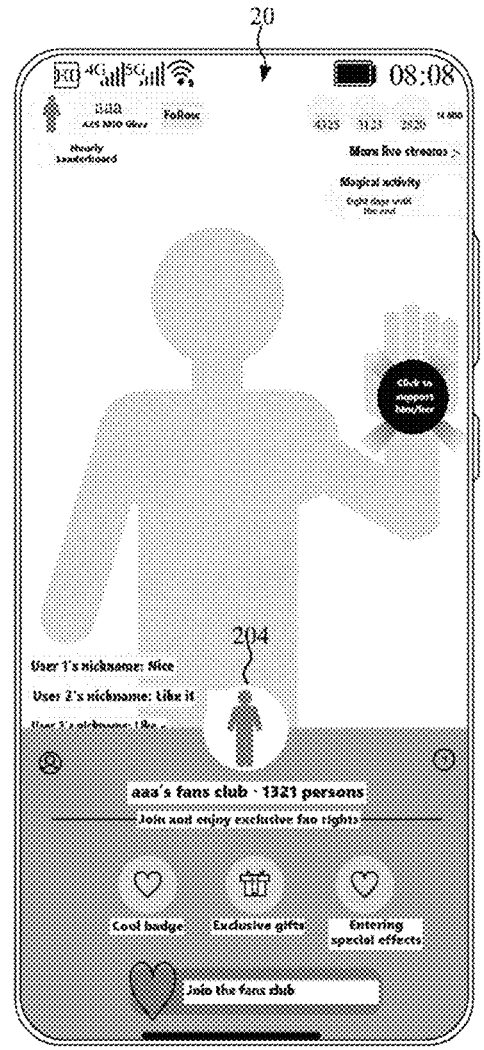
Figure 2K:
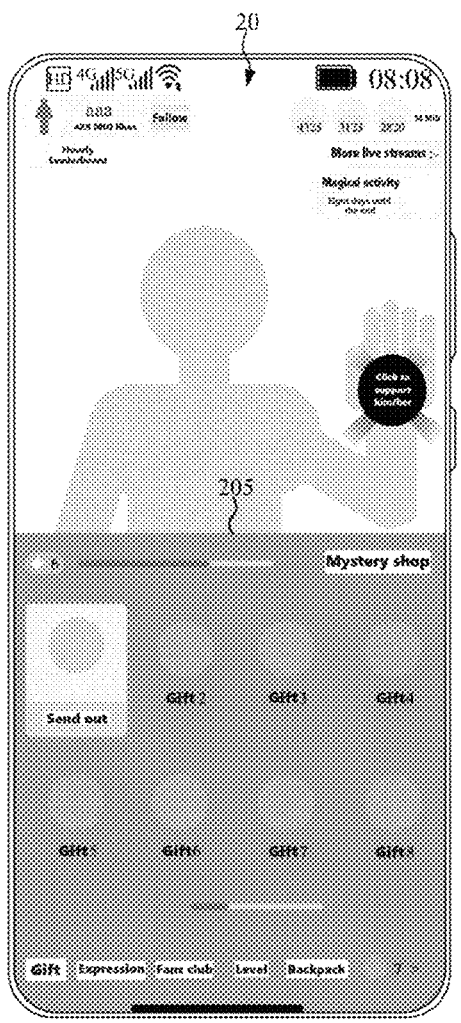

After the application 2 receives an operation, such as clicking the hand gesture control 202, performed by the viewing user in the user interface 20 shown in FIG. 2H, the application 2 may, on the user interface 20, display a window 203 exemplarily shown in FIG. 2I, or display a window 204 exemplarily shown in FIG. 2J, or display a window 205 exemplarily shown in FIG. 2K.

The window 203 is used for displaying the target page for the following-activity page. The window 204 is used for displaying the target page for the fans club panel. The window 205 is used for displaying the target page for the gift panel.

It should be noted that the present disclosure includes, but is not limited to, the target pages displayed in the window 203, window 204, and window 205.

In summary, after the anchor user makes one hand gesture, the application 1 can play back a hand gesture animation matched with a hand gesture category of the hand gesture, and synchronize the hand gesture animation to the application 2 through the first server. The application 2 can play back the hand gesture animation to the viewing user, and meanwhile, detect a trigger operation on a hand gesture control, such that the application 2 enters a target page in time after the viewing user performs the trigger operation on the hand gesture control, which helps to realize close interaction between the viewing user and the anchor user.

In addition, after the playback of the hand gesture animation ends, the application 1 can, on the mobile phone of the anchor user, display the user interface 10 shown in FIG. 2E, without continuing the playback of the hand gesture animation. Moreover, the application 1 can synchronize the audio and video of the network live stream to the application 2 through the first server, without synchronizing the audio and video of the hand gesture animation. Therefore, based on the audio and video of the network live stream, the application 2 can display the user interface 20 shown in FIG. 2G on the mobile phone, and shield a trigger operation on an area where the hand gesture control 202 is located.

In summary, after the playback of the hand gesture animation ends, the application 1 can stop the playback of the hand gesture animation, and synchronize the stop of the playback of the hand gesture animation to the application 2 through the first server. The application 2 can stop the playback of the hand gesture animation to the viewing user, meanwhile, shield the trigger operation on the hand gesture control, which can prevent a misoperation by the viewing user.

Based on the description of the embodiments of FIG. 1 and FIG. 2A to FIG. 2K, in the embodiment of the present disclosure, by taking the client of the anchor user, the first server, and the client of the viewing user in FIG. 1 as examples, in conjunction with the figures and application scenarios, the hand-gesture-based interaction method provided by the present disclosure is described in detail.

Figure 3:
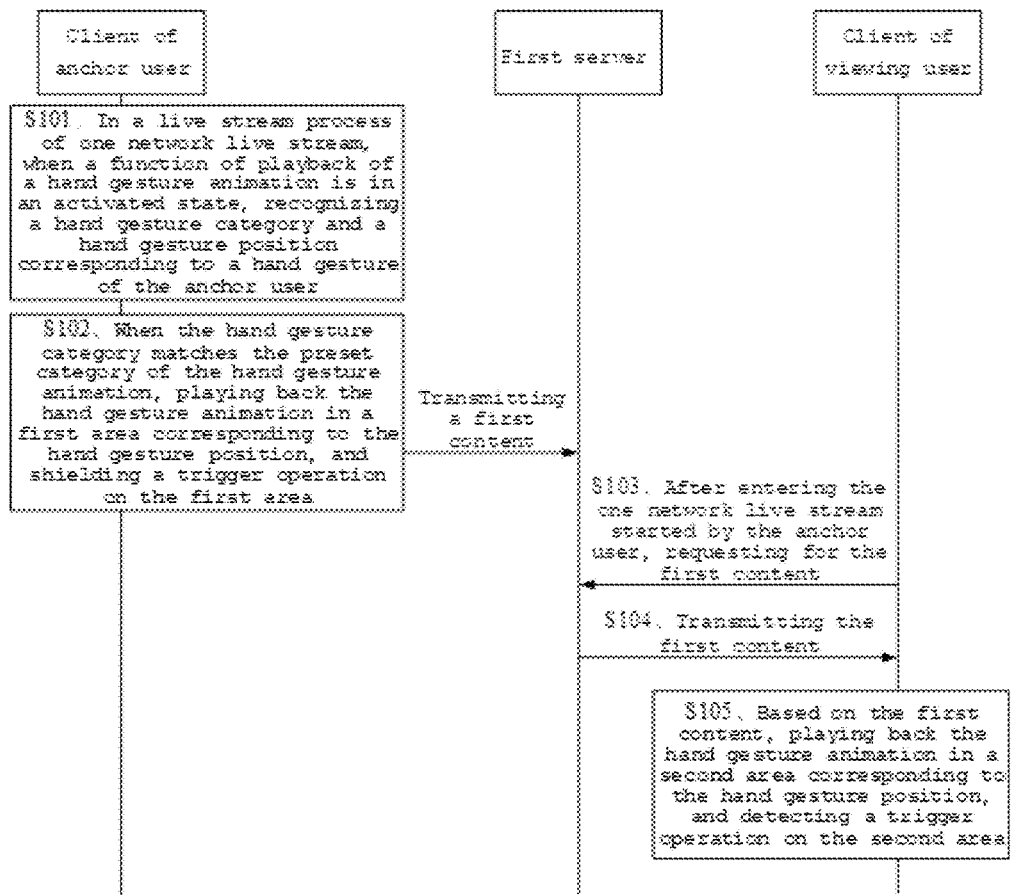
FIG. 3 is a signaling interaction diagram of a hand-gesture-based interaction method provided by an embodiment of the present disclosure.

Reference is made to FIG. 3, which is a signaling interaction diagram of a hand-gesture-based interaction method provided by an embodiment of the present disclosure. As shown in FIG. 3, the hand-gesture-based interaction method provided by the present disclosure may comprise:

S101, in a live stream process of one network live stream, when a function of playback of a hand gesture animation is in an activated state, a client of an anchor user recognizes a hand gesture category and a hand gesture position corresponding to a hand gesture of the anchor user.

In the live stream process of the network live stream, the anchor user may make a hand gesture in the client of the anchor user. When the function of the playback of the hand gesture animation is in an activated state, the client of the anchor user may detect the hand gesture category and the hand gesture position corresponding to the hand gesture of the anchor user in real time.

The specific implementation of the hand gesture category is not limited in the present disclosure. In some embodiments, the hand gesture category may include, but is not limited to, opening five fingers, making a finger heart, clenching a fist, or the like. The hand gesture position is an area where the hand gesture is displayed in a screen of an electronic device of the anchor user, and may be represented in a manner, for example, a center coordinate and a distance or a plurality of coordinates.

Moreover, the client of the anchor user may determine whether the hand gesture category matches a preset category of the hand gesture animation. The specific implementation of the match of the hand gesture category implemented by the client of the anchor user is not limited in the present disclosure. In some embodiments, the client of the anchor user may perform the match of the hand gesture category by introducing an image similarity algorithm.

When the hand gesture category does not match the preset category of the hand gesture animation, the client of the anchor user may continue detecting the hand gesture category and the hand gesture position corresponding to the hand gesture of the anchor user in real time. When the hand gesture category matches the preset category of the hand gesture animation, the client of the anchor user may perform step S102.

S102, when the hand gesture category matches the preset category of the hand gesture animation, the hand gesture animation is played back in a first area corresponding to the hand gesture position, and a first content is transmitted to a first server.

When the hand gesture category matches the preset category of the hand gesture animation, the client of the anchor user may determine a first area corresponding to the hand gesture position. The first area is an area where the hand gesture animation is played back in the screen of the electronic device of the anchor user, and may be represented in a manner, for example, a center coordinate and a distance or a plurality of coordinates, as described for the window 106 shown in FIG. 2F.

Therefore, the client of the anchor user can play back the hand gesture animation in the first area and shield a trigger operation on the first area. Meanwhile, the client of the anchor user can perform a pack process on audio and video of the network live stream and the first content to obtain a data packet. The client of the anchor user transmits the data packet to the first server.

The first content is used for representing a situation of the playback of the hand gesture animation. The specific implementation of the first content is not limit in the present disclosure. In some embodiments, the first content may comprise: a start identification, the preset category, the hand gesture position, and a trigger identification.

The start identification is used for representing start of the playback of the hand gesture animation, for example, represented by a time of the start of the playback. The preset category is used for determining audio and video of the hand gesture animation. The hand gesture position is used for determining a second area where the hand gesture animation is played back in a screen of an electronic device of a viewing user, as described for the display area 201 or the hand gesture control 202 shown in FIG. 2H. The trigger identification is used for representing a webpage address of a target page or a page identification of the target page in a client of the viewing user.

In addition, when the trigger identification is used for representing the webpage address of the target page, the target page may be a webpage, as described for the window 203 shown in FIG. 2I. When the trigger identification is used for representing the page identification of the target page in the client of the viewing user, the target page may be one function panel in the client of the viewing user, as described for the window 204 shown in FIG. 2J or the window 205 shown in FIG. 2K.

In some embodiments, for the specific implementation process of the step S102, reference may be made to the description of the embodiment shown in the change from FIG. 2E to FIG. 2F, which is not repeated herein.

S103, after entering the network live stream started by the anchor user, the client of the viewing user requests for the first content from the first server.

S104, the first server transmits the first content to the client of the viewing user. Accordingly, the client of the viewing user receives the first content.

After the viewing user enters the network live stream started by the anchor user, the client of the viewing user may determine a CDN playback address based on information such as an access address or an identity document (ID) of the network live stream.

Therefore, the client of the viewing user may request the data packet from the first server based on the CDN playback address. The first server may transmit the data packet to the client of the viewing user. The client of the viewing user may perform an unpack process on the data packet to obtain the audio and video of the network live stream and the first content.

S105, the client of the viewing user, based on the first content, plays back the hand gesture animation in the second area corresponding to the hand gesture position and detects a trigger operation on the second area.

After analyzing the first content, the client of the viewing user may determine the hand gesture animation and the second area corresponding to the hand gesture position. The second area is an area where the hand gesture animation is played back in the screen of the electronic device of the viewing user, and may be represented in a manner of, for example, a center coordinate and a distance or a plurality of coordinates, as described for the display area 201 or the hand gesture control 202 shown in FIG. 2H.

The client of the viewing user may, while presenting the audio and video of the network live stream, play back the hand gesture animation in the second area, and detect the trigger operation on the second area. Therefore, after receiving the trigger operation on the second area, the client of the viewing user can display the target page in time, so that the interactive experience of the viewing user is improved.

The trigger operation on the second area is used for triggering the display of the target page, which is used for providing an entry for interaction with the anchor user.

In some embodiments, for the specific implementation process of the step S105, reference may be made to the description of the embodiment shown in FIG. 2H, which is not repeated herein.

According to the hand-gesture-based interaction method provided by this disclosure, in a live stream process of one network live stream, when the function of playback of a hand gesture animation is in an activated state, a client of an anchor user can recognize a hand gesture category and a hand gesture position corresponding to a hand gesture of the anchor user. When the hand gesture category matches a preset category of the hand gesture animation, the client of the anchor user plays back the hand gesture animation in a first area corresponding to the hand gesture position, and transmits a first content to a client of a viewing user through a first server. The client of the viewing user can, based on the first content, play back the hand gesture animation in a second area corresponding to the hand gesture position and detect a trigger operation on the second area. Therefore, in the live stream process of the network live stream, after the anchor user makes one specific hand gesture, the method not only enables the client of the viewing user to synchronously play back the hand gesture animation of the client of the anchor user, but also enables the client of the viewing user to present the trigger area for interaction with the anchor user, so that a close interaction degree between the viewing user and the anchor user is improved, and the interest of the user in using the client is increased.

Based on the description of the embodiment of the step S105, the client of the viewing user may comprise a hand gesture control in the second area, which is used for triggering the display of the target page. Therefore, after receiving a trigger operation on the hand gesture control, the client of the viewing user may display the target page.

Based on the description of the foregoing embodiment, in the embodiment of the present disclosure, by taking the client of the anchor user, the first server, and the client of the viewing user in FIG. 1 as examples, in conjunction with the figures and application scenarios, the hand-gesture-based interaction method provided by the present disclosure has been described in detail.

It should be understood that the signaling interaction diagram of the hand-gesture-based interaction method as shown in FIG. 3 is merely illustrative, rather than restrictive.

In the foregoing step S101, as long as the hand gesture category and the hand gesture position corresponding to the hand gesture of the anchor user can be recognized, the conditions that the client of the anchor user is in the live stream process of the network live stream and the function of the playback of the hand gesture animation is in the activated state are not necessary conditions. It should be understood that the hand-gesture-based interaction method of the present disclosure may also be applied to a scenario of, for example, rebroadcasting. Moreover, it should be understood that in some embodiments, it is possible to perform the function of the playback of the hand gesture animation regardless of the activated state of the function. In the foregoing step S102, "shield a trigger operation on the first area" is not a necessary action. It should be understood that in some embodiments, this action of the shielding may not be performed.

In the foregoing steps S103 to S104, the first server transmits the first content in response to the request from the client of the viewing user. However, the present disclosure is not limited thereto. The client of the anchor user may transmit the first content directly to the client of the viewing user through the first server. In other words, the foregoing step S103 can be omitted.

In the foregoing step S103, the client of the viewing user requests the first content after entering the network live stream started by the anchor user. However, the present disclosure is not limited thereto. As mentioned previously, the hand-gesture-based interaction method of the present disclosure may also be applied to a scenario of, for example, rebroadcasting. The client of the viewing user may receive the first content at any suitable time point.

Figure 4:
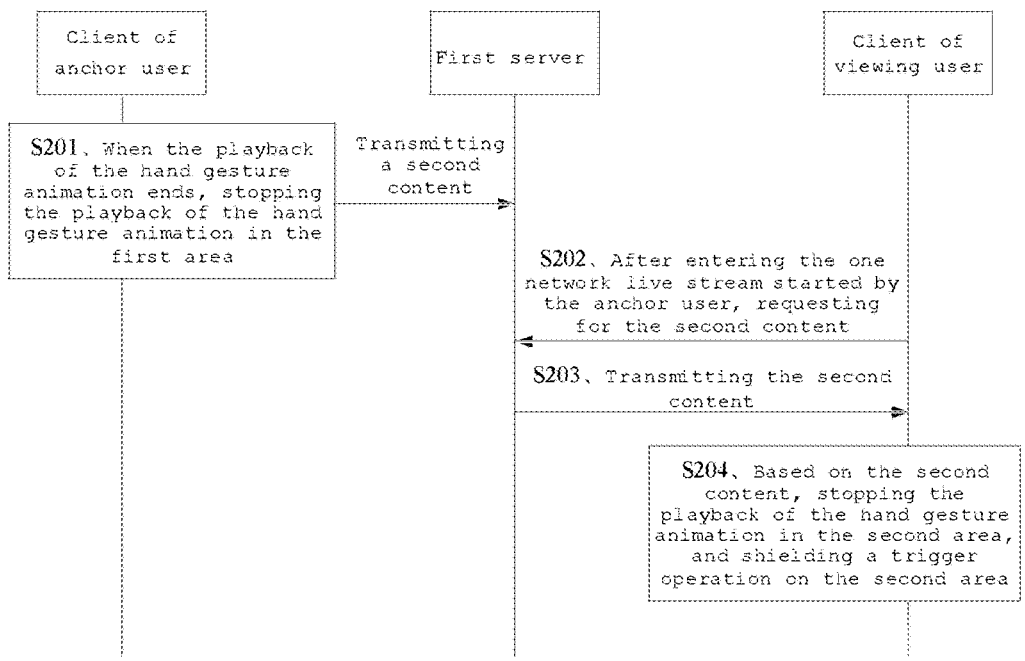
FIG. 4 is a signaling interaction diagram of a hand-gesture-based interaction method provided by an embodiment of the present disclosure.

Reference is made to FIG. 4, which is a signaling interaction diagram of a hand-gesture-based interaction method according to an embodiment of the present disclosure. As shown in FIG. 4, the hand-gesture-based interaction method provided by the present disclosure may comprise:

S201, when the playback of the hand gesture animation ends, the client of the anchor user stops the playback of the hand gesture animation in the first area, and transmits a second content to the first server.

When the playback of the hand gesture animation ends, the client of the anchor user may stop the playback of the hand gesture animation in the first area, and shield the trigger operation on the first area. Meanwhile, the client of the anchor user may perform a pack process on the audio and video of the network live stream and the second content to obtain another data packet. The client of the anchor user transmits the data packet to the first server.

The second content is used for representing a situation of stopping the playback of the hand gesture animation. The specific implementation of the second content is not limited in the present disclosure. In some embodiments, the second content comprises: an ending identification and the preset category. The ending identification is used for representing it is to end the playback of the hand gesture animation, for example, represented by using a time of the end of the playback. The preset category is used for determining the audio and video of the hand gesture animation.

In some embodiments, for the specific implementation process of the step S201, reference may be made to the description of the embodiment shown in the change from FIG. 2F to FIG. 2E, which is not repeated herein.

S202, after entering the network live stream started by the anchor user, the client of the viewing user requests for the second content from the first server.

S203, the first server transmits the second content to the client of the viewing user.

The client of the viewing user has already determined the CDN playback address. Therefore, the client of the viewing user may request the data packet from the first server based on the CDN playback address. The first server may transmit the data packet to the client of the viewing user. The client of the viewing user may perform an unpack process on the data packet to obtain the audio and video of the network live stream and the second content.

S204, the client of the viewing user, based on the second content, stops the playback of the hand gesture animation in the second area, and shields a trigger operation on the second area.

After analyzing the second content, while presenting the audio and video of the network live stream, the client of the viewing user may stop the playback of the hand gesture animation in the second area, and shield the trigger operation on the second area.

In some embodiments, for the specific implementation process of the step S204, reference may be made to the description of the embodiment shown in the change from FIG. 2H to FIG. 2G, which is not repeated herein.

In summary, after the playback of the hand gesture animation ends, in the live stream process of the network live stream, the method not only enables the client of the viewing user to synchronously stop the playback of the hand gesture animation of the client of the anchor user, but also enables the client of the viewing user to shield the trigger area for interaction with the anchor user to avoid a misoperation generated by the viewing user, so that the entire process of the playback of the hand gesture animation is completed.

Based on the description of the above embodiment, the client of the anchor user may provide a banner area in the page where the audio and video of the network live stream is presented, the banner area being used for triggering display of a configuration page.

The specific implementation of the banner area is not limited in this disclosure. In some embodiments, for the specific implementation of the banner area, reference may be made to the description of the banner area 101 in the user interface 10 shown in FIG. 2A.

Therefore, after receiving a trigger operation on the banner area, the client of the anchor user may display the configuration page. The configuration page is used for providing an entry as to whether to activate the function of the playback of the hand gesture animation, and the configuration page may introduce activity explanations of the function of the playback of the hand gesture animation. The specific implementation of the configuration page is not limited in the present disclosure. In some embodiments, for the specific implementation of the configuration page, reference may be made to the description of the window 102 in the user interface 10 shown in FIG. 2B.

Moreover, the configuration page may comprise: a switch control, for activating or deactivating the function of the playback of the hand gesture animation.

The specific implementation of the switch control is not limited in the present disclosure. In some embodiments, for the specific implementation of the switch control, reference may be made to the description of the switch control 103 in the user interface 10 shown in FIGS. 2C and 2D.

Therefore, after receiving a trigger operation on the switch control in a deactivated state, the client of the anchor user may determine whether a resource package of the audio and video of the hand gesture animation has been downloaded, and determine to activate the function of the playback of the hand gesture animation. Therefore, the downloading of the resource package of the audio and video of the hand gesture animation is achieved and the function of the playback of the hand gesture animation is activated.

When the resource package is not downloaded, the client of the anchor user may determine it is the first time to activate the function of the playback of the hand gesture animation.

For the foregoing process, reference may be made to the description of the embodiment shown in the change from FIG. 2C to FIG. 2D.

Hereinafter, in the embodiment of the present disclosure, by taking the client of the anchor user and the second server in FIG. 1 as examples, when it is the first time to activate the function of the playback of the hand gesture animation, a specific implementation process that the client of the anchor user achieves the downloading of the resource package of the audio and video of the hand gesture animation and activates of the function of the playback of the hand gesture animation is described in detail.

Figure 5:
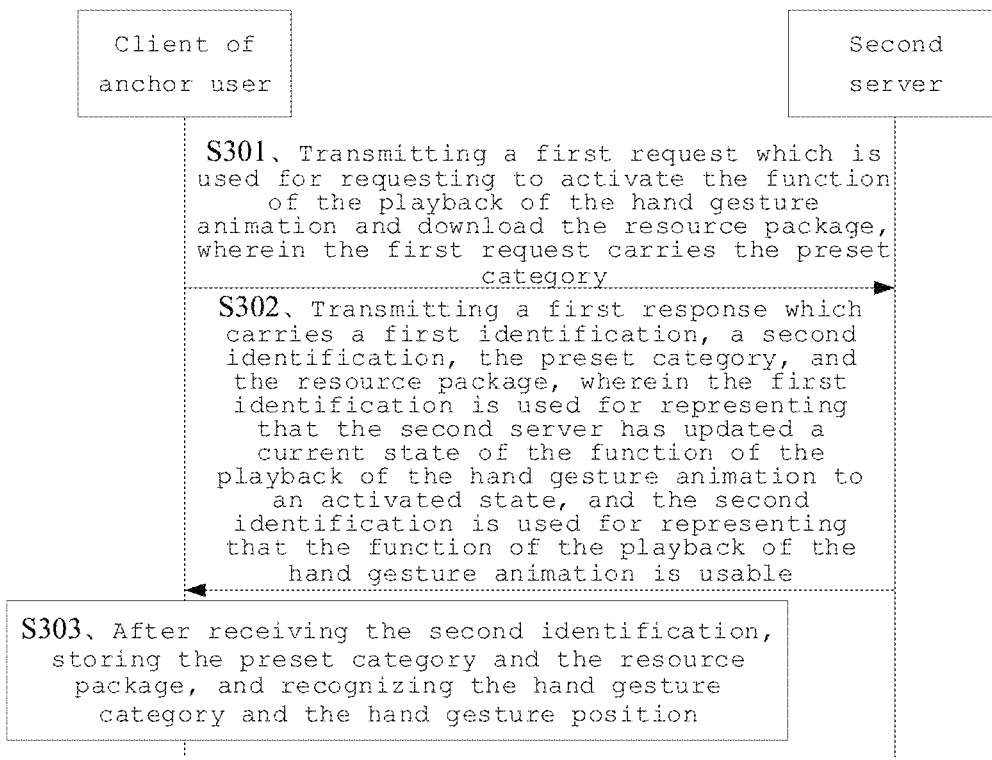
FIG. 5 is a signaling interaction diagram of a hand-gesture-based interaction method provided by an embodiment of the present disclosure.

Reference is made to FIG. 5, which is a signaling interaction diagram of a hand-gesture-based interaction method according to an embodiment of the present disclosure. As shown in FIG. 5, the hand-gesture-based interaction method provided by the present disclosure may comprise:

S301, the client of the anchor user transmits, to the second server, a first request which is used for requesting to activate the function of the playback of the hand gesture animation and download the resource package, wherein the first request carries the preset category.

S302, the second server transmits, to the client of the anchor user, a first response which carries a first identification, a second identification, the preset category, and the resource package, wherein the first identification is used for representing that the second server has updated a current state of the function of the playback of the hand gesture animation to an activated state, and the second identification is used for representing that the function of the playback of the hand gesture animation is usable.

S303, after receiving the second identification, the client of the anchor user stores the preset category and the resource package, and recognizes the hand gesture category and the hand gesture position.

In summary, the client of the anchor user implements the downloading of the resource package of the audio and video of the hand gesture animation and the activation of the function of the playback of the hand gesture animation, which prepares for recognizing the hand gesture of the anchor user and the playback of the hand gesture animation.

When the resource package has been downloaded, the client of the anchor user may determine it is not the first time to activate the function of the playback of the hand gesture animation.

For the foregoing process, reference may be made to the description of the embodiment shown in the change from FIG. 2C to FIG. 2D.

Hereinafter, in the embodiment of the present disclosure, by taking the client of the anchor user and the second server in FIG. 1 as examples, when it is not the first time to activate the function of the playback of the hand gesture animation, a specific implementation process that the client of the anchor user implements the activation of the function of the playback of the hand gesture animation is described in detail.

Figure 6:
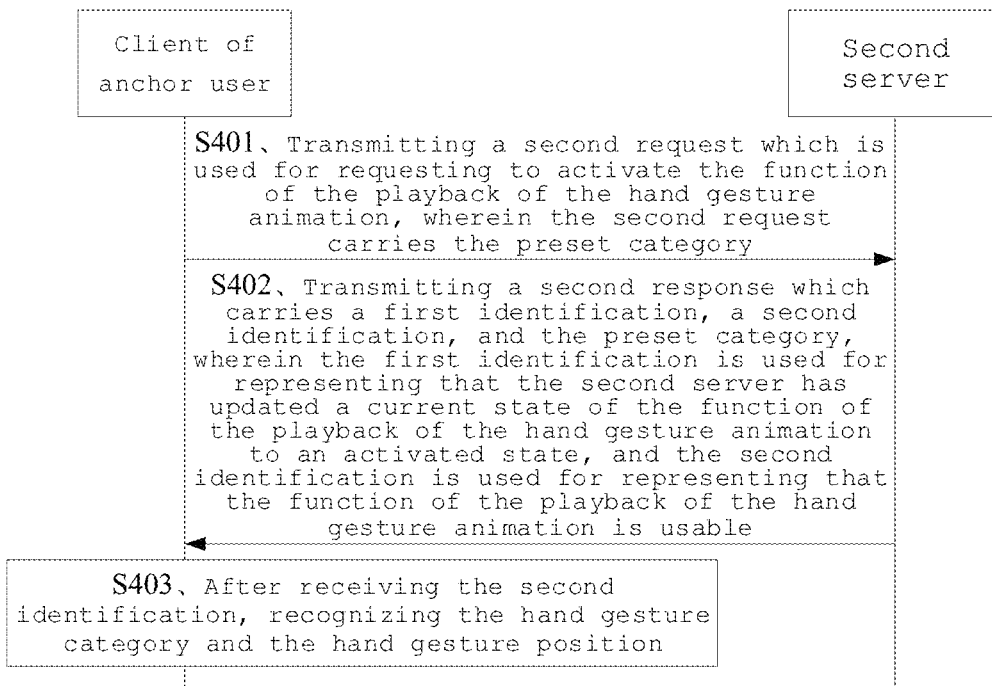
FIG. 6 is a signaling interaction diagram of a hand-gesture-based interaction method provided by an embodiment of the present disclosure.

Reference is made to FIG. 6, which is a signaling interaction diagram of a hand-gesture-based interaction method according to an embodiment of the present disclosure. As shown in FIG. 6, the hand-gesture-based interaction method provided by the present disclosure may comprise:

S401, the client of the anchor user transmits, to the second server, a second request which is used for requesting to activate the function of the playback of the hand gesture animation, wherein the second request carries the preset category.

S402, the second server transmits, to the client of the anchor user, a second response which carries a first identification, a second identification, and the preset category, wherein the first identification is used for representing that the second server has updated a current state of the function of the playback of the hand gesture animation to an activated state, and the second identification is used for representing that the function of the playback of the hand gesture animation is usable.

S403, after receiving the second identification, the client of the anchor user recognizes the hand gesture category and the hand gesture position.

In summary, the client of the anchor user implements the activation of the function of the playback of the hand gesture animation, without needing to download the resource package of the audio and video of the hand gesture animation again, which prepares for recognizing the hand gesture of the anchor user and the playback of the hand gesture animation.

After receiving the trigger operation on the switch control in the activated state, the client of the anchor user may determine to deactivate the function of the playback of the hand gesture animation. Therefore, the deactivation of the function of the playback of the hand gesture animation is achieved.

For the foregoing process, reference may be made to the description of the embodiment shown in the change from FIG. 2D to FIG. 2C.

Hereinafter, in the embodiment of the present disclosure, by taking the client of the anchor user and the second server in FIG. 1 as examples, when the function of the playback of the hand gesture animation is deactivated, a specific implementation process that the client of the anchor user implements the deactivation of the function of the playback of the hand gesture animation is described in detail.

Figure 7:
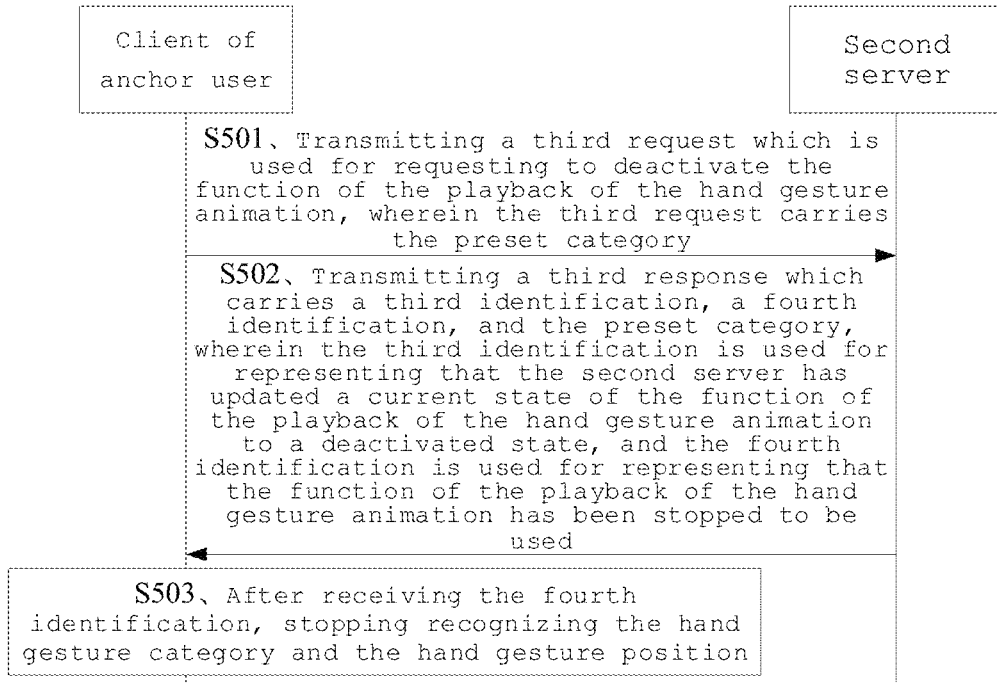
FIG. 7 is a signaling interaction diagram of a hand-gesture-based interaction method provided by an embodiment of the present disclosure.

Reference is made to FIG. 7, which is a signaling interaction diagram of a hand-gesture-based interaction method according to an embodiment of the present disclosure. As shown in FIG. 7, the hand-gesture-based interaction method provided by the present disclosure may comprise:

S501, the client of the anchor user transmits, to the second server, a third request which is used for requesting to deactivate the function of the playback of the hand gesture animation, wherein the third request carries the preset category.

S502, the second server transmits, to the client of the anchor user, a third response which carries a third identification, a fourth identification, and the preset category, wherein the third identification is used for representing that the second server has updated a current state of the function of the playback of the hand gesture animation to a deactivated state, and the fourth identification is used for representing that the function of the playback of the hand gesture animation has been stopped to be used.

S503, after receiving the fourth identification, the client of the anchor user stops recognizing the hand gesture category and the hand gesture position.

In summary, the client of the anchor user implements the deactivation of the function of the playback of the hand gesture animation, which provides the anchor user with a free choice of whether to activate the function of the playback of the hand gesture animation.

Exemplarily, the present disclosure provides a hand-gesture-based interaction apparatus.

Figure 8:
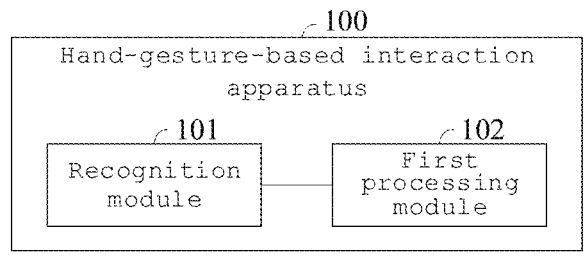
FIG. 8 is a schematic structural diagram of a hand-gesture-based interaction apparatus provided by an embodiment of the present disclosure.

Reference is made to FIG. 8, which is a schematic structural diagram of a hand-gesture-based interaction apparatus provided by an embodiment of the present disclosure. The hand-gesture-based interaction apparatus of the present disclosure may be provided in an electronic device, and may implement the hand-gesture-based interaction method in the embodiments of FIG. 1 to FIG. 7 described above, which corresponds to the operations of the client of the anchor user.

As shown in FIG. 8, the hand-gesture-based interaction apparatus 100 provided by the present disclosure may comprise: a recognition module 101 and a first processing module 102.

The recognition module 101 is configured to, in a live stream process of network live stream, when a function of playback of a hand gesture animation is in an activated state, recognize a hand gesture category and a hand gesture position corresponding to a hand gesture of an anchor user; and The first processing module 102 is configured to, when the hand gesture category matches a preset category of a hand gesture animation, play back the hand gesture animation in a first area corresponding to the hand gesture position, and transmit a first content which is used for representing a situation of the playback of the hand gesture animation to a client of a viewing user through a first server, so that the client of the viewing user, based on the first content, plays back the hand gesture animation in a second area corresponding to the hand gesture position and detects a trigger operation on the second area, wherein the trigger operation on the second area is used for triggering display of a target page, and the target page is used for providing an entry for interaction with the anchor user.

The first processing module 102 is further configured to shield a trigger operation on the first area while playing back the hand gesture animation in the first area.

In some embodiments, the first content comprises: a start identification, the preset category, the hand gesture position, and/or a trigger identification, wherein the start identification is used for representing it is to start the playback of the hand gesture animation, the preset category is used for determining audio and video of the hand gesture animation, the hand gesture position is used for determining the second area, and the trigger identification is used for representing a webpage address of the target page or a page identification of the target page in the client of the viewing user.

In some embodiments, the first processing module 102 is further configured to, when the playback of the hand gesture animation ends, stop the playback of the hand gesture animation in the first area, and transmit a second content which is used for representing a situation of stopping the playback of the hand gesture animation to the client of the viewing user through the first server, so that, based on the second content, the client of the viewing user stops the playback of the hand gesture animation in the second area and shields the trigger operation on the second area.

In some embodiments, the second content comprises: an ending identification and the preset category, wherein the ending identification is used for representing it is to end the playback of the hand gesture animation, and the preset category is used for determining the audio and video of the hand gesture animation.

In some embodiments, the first processing module 102 is further configured to, after receiving a trigger operation on a banner area, display a configuration page which is used for providing an entry as to whether to activate a function of the playback of the hand gesture animation, wherein the configuration page comprises a switch control which is used for activating or deactivating the function of the playback of the hand gesture animation; after receiving a trigger operation on the switch control in a deactivated state, determine whether a resource package of the audio and video of the hand gesture animation has been downloaded; when the resource package has not been downloaded, determine it is the first time to activate the function of the playback of the hand gesture animation; and when the resource package has been downloaded, determine it is not the first time to activate the function of the playback of the hand gesture animation.

In some embodiments, the first processing module 102 is specifically configured to, when it is the first time to activate the function of the playback of the hand gesture animation, transmit, to a second server, a first request which is used for requesting to activate the function of the playback of the hand gesture animation and download the resource package, wherein the first request carries the preset category; receive, from the second server, a first response which carries a first identification, a second identification, the preset category, and the resource package, wherein the first identification is used for representing that the second server has updated a current state of the function of the playback of the hand gesture animation to an activated state, and the second identification is used for representing that the function of the playback of the hand gesture animation is usable; and after receiving the second identification, store the preset category and the resource package, and recognize the hand gesture category and the hand gesture position.

In some embodiments, the first processing module is specifically configured to, when it is not the first time to activate the function of the playback of the hand gesture animation, transmit, to the second server, a second request which is used for requesting to activate the function of the playback of the hand gesture animation, wherein the second request carries the preset category; receive, from the second server, a second response which carries a first identification, a second identification, and the preset category, wherein the first identification is used for representing that the second server has updated a current state of the function of the playback of the hand gesture animation to an activated state, and the second identification is used for representing that the function of the playback of the hand gesture animation is usable; and after receiving the second identification, recognize the hand gesture category and the hand gesture position.

In some embodiments, the first processing module 102 is further configured to, after receiving a trigger operation on the switch control in an activated state, determine to deactivate the function of the playback of the hand gesture animation.

In some embodiments, the first processing module 102 is specifically configured to, when the function of the playback of the hand gesture animation is deactivated, transmit, to the second server, a third request which is used for requesting to deactivate the function of the playback of the hand gesture animation, wherein the third request carries the preset category; receive, from the second server, a third response which carries a third identification, a fourth identification, and the preset category, wherein the third identification is used for representing that the second server has updated a current state of the function of the playback of the hand gesture animation to a deactivated state, and the fourth identification is used for representing that the function of the playback of the hand gesture animation has been stopped to be used; and after receiving the fourth identification, stop recognizing the hand gesture category and the hand gesture position.

The hand-gesture-based interaction apparatus provided by the present disclosure may implement the above-mentioned method embodiments, and for specific implementation principles and technical effects, reference may be made to the above-mentioned method embodiments, which are not repeated herein.

Exemplarily, the present disclosure provides a hand-gesture-based interaction apparatus.

Figure 9:
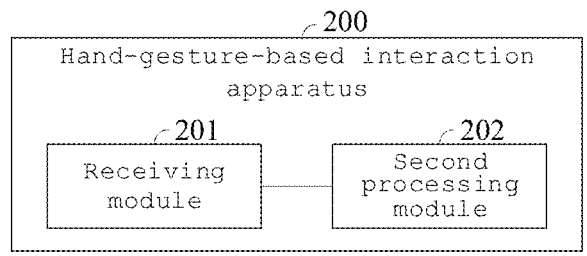
FIG. 9 is a schematic structural diagram of a hand-gesture-based interaction apparatus provided by an embodiment of the present disclosure.

Reference is made to FIG. 9, which is a schematic structural diagram of a hand-gesture-based interaction apparatus provided by an embodiment of the present disclosure. The hand-gesture-based interaction apparatus of the present disclosure may be provided in an electronic device, and may implement the hand-gesture-based interaction method in the embodiments of FIGS. 1 to 7 described above, which corresponds to the operations of the client of the viewing user.

As shown in FIG. 9, the hand-gesture-based interaction apparatus 200 provided by the present disclosure may comprise: a receiving module 201 and a second processing module 202.

The receiving module 201 is configured to receive a first content from a client of an anchor user through a first server, wherein the first content is used for representing a situation of playback of the hand gesture animation, and the first content is transmitted by the client of the anchor user when a hand gesture category corresponding to a hand gesture of the anchor user matches a preset category of a hand gesture animation.

The second processing module 202 is configured to, based on the first content, play back the hand gesture animation in a second area which corresponds to a hand gesture position corresponding to the hand gesture of the anchor user and detect a trigger operation on the second area, wherein the trigger operation on the second area is used for triggering display of a target page, and the target page is used for providing an entry for interaction with the anchor user.

In some embodiments, the first content comprises: a start identification, the preset category, the hand gesture position, and/or a trigger identification, wherein the start identification is used for representing that it is to start the playback of the hand gesture animation, the preset category is used for determining audio and video of the hand gesture animation, the hand gesture position is used for determining the second area, and the trigger identification is used for representing a webpage address of the target page or a page identification of the target page in the client of the viewing user.

In some embodiments, the second processing module 202 is further configured to comprise a hand gesture control in the second area, wherein the hand gesture control is used for triggering the display of the target page; and after receiving a trigger operation on the hand gesture control, display the target page.

In some embodiments, the second processing module 202 is further configured to receive a second content which is used for representing a situation of stopping the playback of the hand gesture animation from the client of the anchor user through the first server, wherein the second content is transmitted by the client of the anchor user when the playback of the hand gesture animation ends; and based on the second content, stop the playback of the hand gesture animation in the second area, and shield the trigger operation on the second area.

In some embodiments, the second content comprises: an ending identification and the preset category, wherein the ending identification is used for representing that it is to end the playback of the hand gesture animation, and the preset category is used for determining audio and video of the hand gesture animation.

The hand-gesture-based interaction apparatus provided by the present disclosure may implement the above-mentioned method embodiments, and for specific implementation principles and technical effects, reference may be made to the above-mentioned method embodiments, which are not repeated herein.

Figure 10:
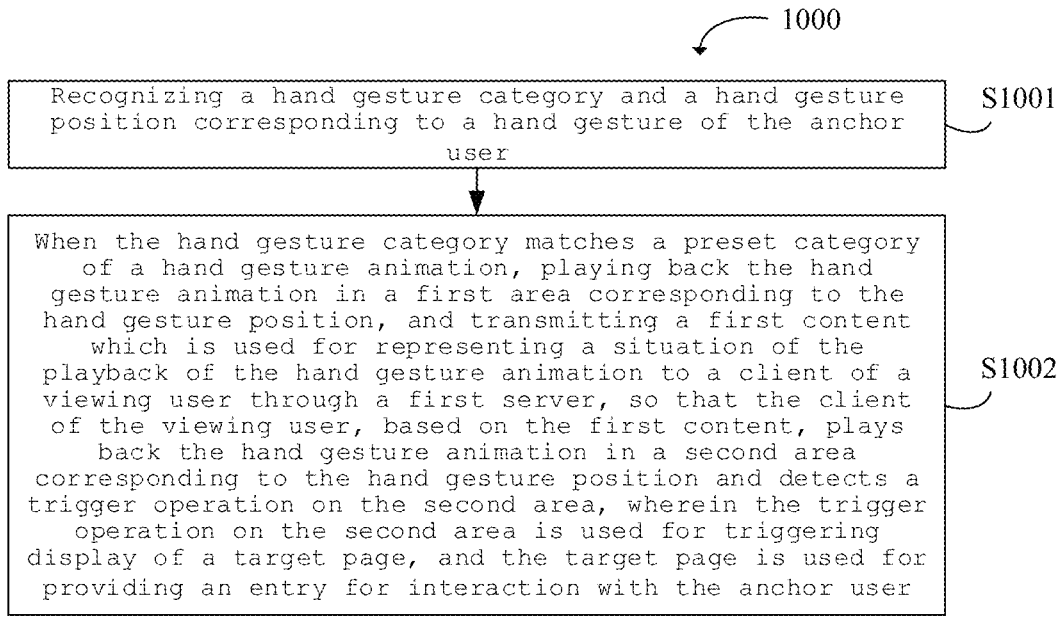
FIG. 10 is a flow diagram of a hand-gesture-based interaction method 1000 applied to a client of an anchor user provided by an embodiment of the present disclosure.

Reference is made to FIG. 10, which is a flow diagram of a hand-gesture-based interaction method 1000 applied to a client of an anchor user provided by an embodiment of the present disclosure.

As shown in FIG. 10, a hand-gesture-based interaction method 1000 provided by the present disclosure applied to a client of an anchor user may comprise: a recognition step S1001 and a first processing step S1002.

In the recognition step S1001, a hand gesture category and a hand gesture position corresponding to a hand gesture of the anchor user are recognized.

In the first processing step S1002, when the hand gesture category matches a preset category of a hand gesture animation, the hand gesture animation is played back in a first area corresponding to the hand gesture position, and a first content which is used for representing a situation of the playback of the hand gesture animation is transmitted to a client of a viewing user through a first server, so that the client of the viewing user, based on the first content, plays back the hand gesture animation in a second area corresponding to the hand gesture position and detects a trigger operation on the second area, wherein the trigger operation on the second area is used for triggering display of a target page, and the target page is used for providing an entry for interaction with the anchor user.

Step S1001 and step S1002 may be implemented, for example, by the client of the anchor user. More specifically, steps S1001 and S1002 may be implemented, for example, by a processor of the client of the anchor user executing a computer program.

Figure 11:
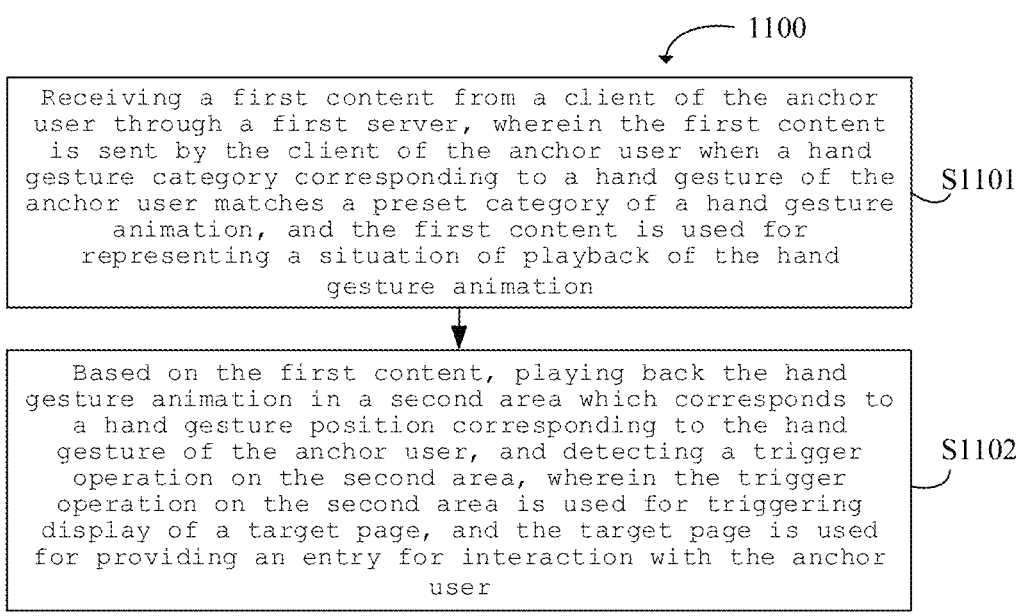
FIG. 11 is a flow diagram of a hand-gesture-based interaction method 1100 applied to a client of a viewing user provided by an embodiment of the present disclosure.

Reference is made to FIG. 11, which is a flow diagram of a hand-gesture-based interaction method 1100 applied to a client of a viewing user provided by an embodiment of the present disclosure.

As shown in FIG. 11, a hand-gesture-based interaction method 1100 applied to a client of a viewing user provided by the present disclosure may comprise: a receiving step S1101 and a second processing step S1102.

In the receiving step S1101, a first content is received from a client of an anchor user through a first server, wherein the first content is transmitted by the client of the anchor user when a hand gesture category corresponding to a hand gesture of the anchor user matches a preset category of a hand gesture animation, and the first content is used for representing a situation of playback of the hand gesture animation.

In the second processing step S1102, based on the first content, the hand gesture animation is played back in a second area which corresponds to a hand gesture position corresponding to the hand gesture of the anchor user, and a trigger operation on the second area is detected, wherein the trigger operation on the second area is used for triggering display of a target page, and the target page is used for providing an entry for interaction with the anchor user.

Step S1101 and step S1102 may be implemented, for example, by the client of the viewing user. More specifically, steps S1101 and S1102 may be implemented, for example, by a processor of the client of the viewing user executing a computer program.

Exemplarily, the present disclosure provides a client, comprising: one or more processors; a memory; and one or more computer programs, wherein the one or more computer programs are stored in the memory; and the one or more processors, when executing the one or more computer programs, cause the client to implement the hand-gesture-based interaction method according to the foregoing embodiments.

Exemplarily, the present disclosure provides a chip system applied to an electronic device including a display, a memory, and a sensor; wherein the chip system comprises: a processor; and when the processor executes computer instructions stored in the memory, the electronic device performs the hand-gesture-based interaction method according to the foregoing embodiments.

Exemplarily, the present disclosure provides a non-transitory computer-readable storage medium having stored thereon a computer program which, when executed by a processor, causes an electronic device to implement the hand-gesture-based interaction method according to the foregoing embodiments.

Exemplarily, the present disclosure provides a computer program product having stored thereon a computer program which, when being run on a computer, causes the computer to perform the hand-gesture-based interaction method according to the foregoing embodiments.

Exemplarily, the present disclosure provides a computer program which, when being run on a computer, causes the computer to perform the hand-gesture-based interaction method according to the foregoing embodiments.

In the above embodiments, all or part of the functions may be implemented by software, hardware, or a combination of software and hardware. When implemented by software, the functions may be implemented fully or partially in a form of a computer program product. The computer program product includes one or more computer instructions. When the computer program instructions are loaded and executed on a computer, the procedures or functions according to the embodiments of the present disclosure are fully or partially generated. The computer may be a general-purpose computer, a special-purpose computer, a computer network, or other programmable devices. The computer instructions may be stored in a computer-readable storage medium. The computer-readable storage medium can be any available medium that a computer can access or a data storage device such as a server, data center, etc., that includes one or more available media integrated therein. The available medium may be a magnetic medium (e.g., a floppy disk, a hard disk, a magnetic tape), an optical medium (e.g., a DVD), a semiconductor medium (e.g., a solid state disk (SSD)), or the like.

It should be noted that, relational terms such as "first" and "second", herein, are only used for distinguishing one entity or operation from another entity or operation without necessarily requiring or implying any such actual relation or order between these entities or operations. Moreover, the term "include", "comprise", or any other variation thereof, is intended to encompass a non-exclusive inclusion, such that a process, method, article, or device including a list of elements includes not only those elements but also other elements not expressly listed or elements inherent to such a process, method, article, or device. Without more limitations, an element defined by a statement "including a . . . " does not exclude the presence of another identical element in the process, method, article, or device that includes the element.

The above contents are only specific implementations of the present disclosure, which enable those skilled in the art to understand or implement the present disclosure. Various modifications to these embodiments will be apparent to those skilled in the art, and the general principles defined herein may be implemented in other embodiments without departing from the spirit or scope of the present disclosure. Therefore, the present disclosure will not be limited to these embodiments described herein, but conform to the widest scope consistent with the principles and novel features disclosed herein.

What is claimed is:

1. A hand-gesture-based interaction method applied to a client of an anchor user, the method comprising:

recognizing a hand gesture category and a hand gesture position corresponding to a hand gesture of the anchor user, wherein the hand gesture of the anchor user is recognized from a video of the anchor user which is shot by the client of the anchor user; and in response to the hand gesture category matching a preset category of a hand gesture animation, playing back the hand gesture animation in a first area corresponding to the hand gesture position, and shielding a trigger operation on the first area, wherein the hand gesture animation is acquired from a resource package of the hand gesture animation which is associated with the preset category, and, in response to the hand gesture category matching the preset category of the hand gesture animation, transmitting a first content which is used for representing a situation of the playback of the hand gesture animation to a client of a viewing user through a first server, so that the client of the viewing user, based on the first content, plays back the hand gesture animation in a second area corresponding to the hand gesture position and detects a trigger operation on the second area, wherein the trigger operation on the second area is used for triggering display of a target page, and the target page is used for providing an entry for interaction with the anchor user.

2. The method according to claim 1, wherein the first content comprises at least one of a start identification, the preset category, the hand gesture position, and a trigger identification, wherein the start identification is used for representing that it is to start the playback of the hand gesture animation, the preset category is used for determining at least one of audio and video of the hand gesture animation, the hand gesture position is used for determining the second area, and the trigger identification is used for representing a webpage address of the target page or a page identification of the target page in the client of the viewing user.

3. The method according to claim 1, wherein the method further comprises:

in response to the playback of the hand gesture animation ending, stopping the playback of the hand gesture animation in the first area, and transmitting a second content which is used for representing a situation of stopping the playback of the hand gesture animation to the client of the viewing user through the first server, so that the client of the viewing user, based on the second content, stops the playback of the hand gesture animation in the second area and shields the trigger operation on the second area.

4. The method according to claim 3, wherein the second content comprises: an ending identification and the preset category, wherein the ending identification is used for representing that it is to end the playback of the hand gesture animation, and the preset category is used for determining at least one of audio and video of the hand gesture animation.

5. The method according to claim 1, wherein the method further comprises:

after receiving a trigger operation on a banner area, displaying a configuration page which is used for providing an entry as to whether to activate a function of the playback of the hand gesture animation, wherein the configuration page comprises a switch control which is used for activating or deactivating the function of the playback of the hand gesture animation;

after receiving a trigger operation on the switch control in a deactivated state, determining whether the resource package of the hand gesture animation has been downloaded, wherein the resource package comprises at least one of audio and video of the hand gesture animation;

in response to that the resource package has not been downloaded, determining it is the first time to activate the function of the playback of the hand gesture animation; and in response to that the resource package has been downloaded, determining it is not the first time to activate the function of the playback of the hand gesture animation.

6. The method according to claim 5, wherein in response to that it is the first time to activate the function of the playback of the hand gesture animation, the method further comprises:

transmitting, to a second server, a first request which is used for requesting to activate the function of the playback of the hand gesture animation and download the resource package, wherein the first request carries the preset category;

receiving, from the second server, a first response which carries a first identification, a second identification, the preset category, and the resource package, wherein the first identification is used for representing that the second server has updated a current state of the function of the playback of the hand gesture animation to an activated state, and the second identification is used for representing that the function of the playback of the hand gesture animation is usable; and after receiving the second identification, storing the preset category and the resource package, and recognizing the hand gesture category and the hand gesture position.

7. The method according to claim 5, wherein in response to that it is not the first time to activate the function of the playback of the hand gesture animation, the method further comprises:

transmitting, to the second server, a second request which is used for requesting to activate the function of the playback of the hand gesture animation, wherein the second request carries the preset category;

receiving, from the second server, a second response which carries a first identification, a second identification, and the preset category, wherein the first identification is used for representing that the second server has updated a current state of the function of the playback of the hand gesture animation to an activated state, and the second identification is used for representing that the function of the playback of the hand gesture animation is usable; and after receiving the second identification, recognizing the hand gesture category and the hand gesture position.

8. The method according to claim 5, wherein the method further comprises:

after receiving a trigger operation on the switch control in an activated state, determining to deactivate the function of the playback of the hand gesture animation.

9. The method according to claim 8, wherein in response to that the function of the playback of the hand gesture animation is deactivated, the method further comprises:

transmitting, to the second server, a third request which is used for requesting to deactivate the function of the playback of the hand gesture animation, wherein the third request carries the preset category;

receiving, from the second server, a third response which carries a third identification, a fourth identification, and the preset category, wherein the third identification is used for representing that the second server has updated a current state of the function of the playback of the hand gesture animation to a deactivated state, and the fourth identification is used for representing that the function of the playback of the hand gesture animation has been stopped to be used; and after receiving the fourth identification, stopping recognizing the hand gesture category and the hand gesture position.

10. A hand-gesture-based interaction method applied to a client of a viewing user, the method comprising:

receiving a first content from a client of an anchor user through a first server, wherein the first content is transmitted by the client of the anchor user in response to a hand gesture category corresponding to a hand gesture of the anchor user matching a preset category of a hand gesture animation, and the first content is used for representing a situation of playback of the hand gesture animation, wherein the hand gesture of the anchor user is recognized from a video of the anchor user which is shot by the client of the anchor user, and wherein at the client of the anchor user, in response to the hand gesture category matching the preset category of the hand gesture animation, the hand gesture animation is played back in a first area corresponding to a hand gesture position which corresponds to the hand gesture of the anchor user, and a trigger operation on the first area is shielded; and based on the first content, playing back the hand gesture animation in a second area which corresponds to a hand gesture position corresponding to the hand gesture of the anchor user, wherein the hand gesture animation is acquired from a resource package of the hand gesture animation which is associated with the preset category, and detecting a trigger operation on the second area, wherein the trigger operation on the second area is used for triggering display of a target page, and the target page is used for providing an entry for interaction with the anchor user.

11. The method according to claim 10, wherein the first content comprises at least one of a start identification, the preset category, the hand gesture position, and a trigger identification, wherein the start identification is used for representing that it is to start the playback of the hand gesture animation, the preset category is used for determining at least one of audio and video of the hand gesture animation, the hand gesture position is used for determining the second area, and the trigger identification is used for representing a webpage address of the target page or a page identification of the target page in the client of the viewing user.

12. The method according to claim 10, wherein a hand gesture control is comprised in the second area, wherein the hand gesture control is used for triggering the display of the target page; and the method further comprises:

after receiving a trigger operation on the hand gesture control, displaying the target page.

13. The method according to claim 10, wherein the method further comprises:

receiving a second content which is used for representing a situation of stopping the playback of the hand gesture animation from the client of the anchor user through the first server, wherein the second content is transmitted by the client of the anchor user in response to the playback of the hand gesture animation ending; and based on the second content, stopping the playback of the hand gesture animation in the second area and shielding the trigger operation on the second area.

14. The method according to claim 13, wherein the second content comprises: an ending identification and the preset category, wherein the ending identification is used for representing that it is to end the playback of the hand gesture animation, and the preset category is used for determining at least one of audio and video of the hand gesture animation.

15. A client, comprising: one or more processors; a memory; and one or more computer programs, wherein the one or more computer programs are stored in the memory; and, the one or more processors, when executing the one or more computer programs, cause the client to perform the following operations:

recognizing a hand gesture category and a hand gesture position corresponding to a hand gesture of the anchor user, wherein the hand gesture of the anchor user is recognized from a video of the anchor user which is shot by the client of the anchor user; and in response to the hand gesture category matching a preset category of a hand gesture animation, playing back the hand gesture animation in a first area corresponding to the hand gesture position, and shielding a trigger operation on the first area, wherein the hand gesture animation is acquired from a resource package of the hand gesture animation which is associated with the preset category, and, in response to the hand gesture category matching the preset category of the hand gesture animation, transmitting a first content which is used for representing a situation of the playback of the hand gesture animation to a client of a viewing user through a first server, so that the client of the viewing user, based on the first content, plays back the hand gesture animation in a second area corresponding to the hand gesture position and detects a trigger operation on the second area, wherein the trigger operation on the second area is used for triggering display of a target page, and the target page is used for providing an entry for interaction with the anchor user.

16. The client according to claim 15, wherein the first content comprises at least one of a start identification, the preset category, the hand gesture position, and a trigger identification, wherein the start identification is used for representing that it is to start the playback of the hand gesture animation, the preset category is used for determining at least one of audio and video of the hand gesture animation, the hand gesture position is used for determining the second area, and the trigger identification is used for representing a webpage address of the target page or a page identification of the target page in the client of the viewing user.

17. A non-transitory computer storage medium, comprising computer instructions which, when being run on an electronic device, cause the electronic device to perform the hand-gesture-based interaction method according to claim 1.

18. A client, comprising: one or more processors; a memory; and one or more computer programs, wherein the one or more computer programs are stored in the memory; and, the one or more processors, when executing the one or more computer programs, cause the client to implement the hand-gesture-based interaction method according to claim 10.

19. A client, comprising: one or more processors; a memory; and one or more computer programs, wherein the one or more computer programs are stored in the memory; and, the one or more processors, when executing the one or more computer programs, cause the client to implement the method according to claim 11.

20. A non-transitory computer storage medium, comprising computer instructions which, when being run on an electronic device, cause the electronic device to perform the hand-gesture-based interaction method according to claim 10.

* * * * *